United States Patent
Min et al.

(10) Patent No.: US 10,626,717 B2
(45) Date of Patent: Apr. 21, 2020

(54) SYSTEM AND PROGRAM FOR PREDICTING THE SHEARING BY FLUID PRESSURE

(71) Applicant: Seoul National University R & DB Foundation, Seoul (KR)

(72) Inventors: Ki-Bok Min, Gyeonggi-do (KR); Sehyeok Park, Seoul (KR); Linmao Xie, Seoul (KR)

(73) Assignee: Seoul National University R & DB Foundation, Seoul (KR)

( * ) Notice: Subject to any disclaimer, the term of this patent is extended or adjusted under 35 U.S.C. 154(b) by 139 days.

(21) Appl. No.: 15/348,750

(22) Filed: Nov. 10, 2016

(65) Prior Publication Data
US 2018/0106143 A1 Apr. 19, 2018

(30) Foreign Application Priority Data
Oct. 13, 2016 (KR) .......................... 10-2016-0132918

(51) Int. Cl.
*E21B 47/06* (2012.01)
*G01V 99/00* (2009.01)
*G01N 13/02* (2006.01)

(52) U.S. Cl.
CPC ............. *E21B 47/06* (2013.01); *G01N 13/02* (2013.01); *G01V 99/005* (2013.01); *G01N 2013/0216* (2013.01)

(58) Field of Classification Search
CPC .............. E21B 47/06; G01N 13/02; G01N 2013/0216; G01V 1/00
(Continued)

(56) References Cited

U.S. PATENT DOCUMENTS

| | | | | |
|---|---|---|---|---|
| 6,076,046 A | * | 6/2000 | Vasudevan | E21B 43/267 166/250.08 |
| 6,766,254 B1 | * | 7/2004 | Bradford | E21B 44/00 367/73 |

(Continued)

FOREIGN PATENT DOCUMENTS

| | | | |
|---|---|---|---|
| CN | 107121703 A | * | 9/2017 |
| JP | 10090051 A | | 4/1998 |
| JP | 3567407 B2 | * | 9/2004 |

OTHER PUBLICATIONS

L. Xie et al, "Observations of hydraulic stimulations in seven enhanced geothermal system projects", Renewable Energy 79(2015) 56-65, http://dx.doi.org/10.1016/j.renene.2014.07.044.*
(Continued)

*Primary Examiner* — Sujoy K Kundu
*Assistant Examiner* — Douglas Kay
(74) *Attorney, Agent, or Firm* — Blueshift IP, LLC; Robert Plotkin

(57) ABSTRACT

The present disclosure relates to a system and program for predicting shearing by fluid pressure, the system and program capable of predicting shearing information such as the minimum pressure $P_{cm}$ required for hydraulic shearing, the sufficient pressure $P_{co}$ for hydraulic shearing, and the optimal shearing direction using input information including the vertical stress $\sigma_v$, the maximum horizontal stress and the minimum horizontal stress of a rock to which fluid is to be injected, a joint friction angle $\phi$, a reservoir rock density $\rho_r$, an injected fluid density, and a coefficient of the sufficient pressure for hydraulic shearing $\alpha$.

15 Claims, 15 Drawing Sheets

(58) Field of Classification Search
USPC .......................................................... 702/11
See application file for complete search history.

(56) References Cited

U.S. PATENT DOCUMENTS

| | | | | |
|---|---|---|---|---|
| 8,731,889 B2* | 5/2014 | Du | ........................ | E21B 43/267 703/10 |
| 2011/0257944 A1* | 10/2011 | Du | ........................ | E21B 43/267 703/2 |
| 2016/0108705 A1* | 4/2016 | Maxwell | ............... | E21B 43/267 166/250.1 |
| 2017/0299742 A1* | 10/2017 | Ray | ........................ | G01V 1/288 |

OTHER PUBLICATIONS

B. Park et al, "Bonded-particle discrete element modeling of mechanical behavior of transversely isotropic rock", International Journal of Rock Mechanics & Mining Sciences 76 (2015) 243-255, http://dx.doi.org/10.1016/j.ijrmms.2015.03.014.*

Lee, et al., "Effect of in-situ stress on the leakage potential associated with CO2 geosequestration investigated by probabilistic leakage analysis," Rock Mechanics and Rock Engineering laboratory, Seoul National University, Korea CCS Conference, Mar. 15, 2013, 25 pp.

* cited by examiner

```
X            Y            Z          Dip      Dip direction
-0.727469   -0.349653    0.361196    75.285858    151.938677
 0.002494    0.107948   -2.049170    60.189236     23.554691
 0.353414    0.359148   -1.069909    65.528164    174.726243
-0.001756    0.576441    0.415665    33.265720    153.416764
 0.907393    0.493143   -1.923850    48.328618    170.533745
 0.762653    0.081353   -0.868059    41.116530    166.155271
```

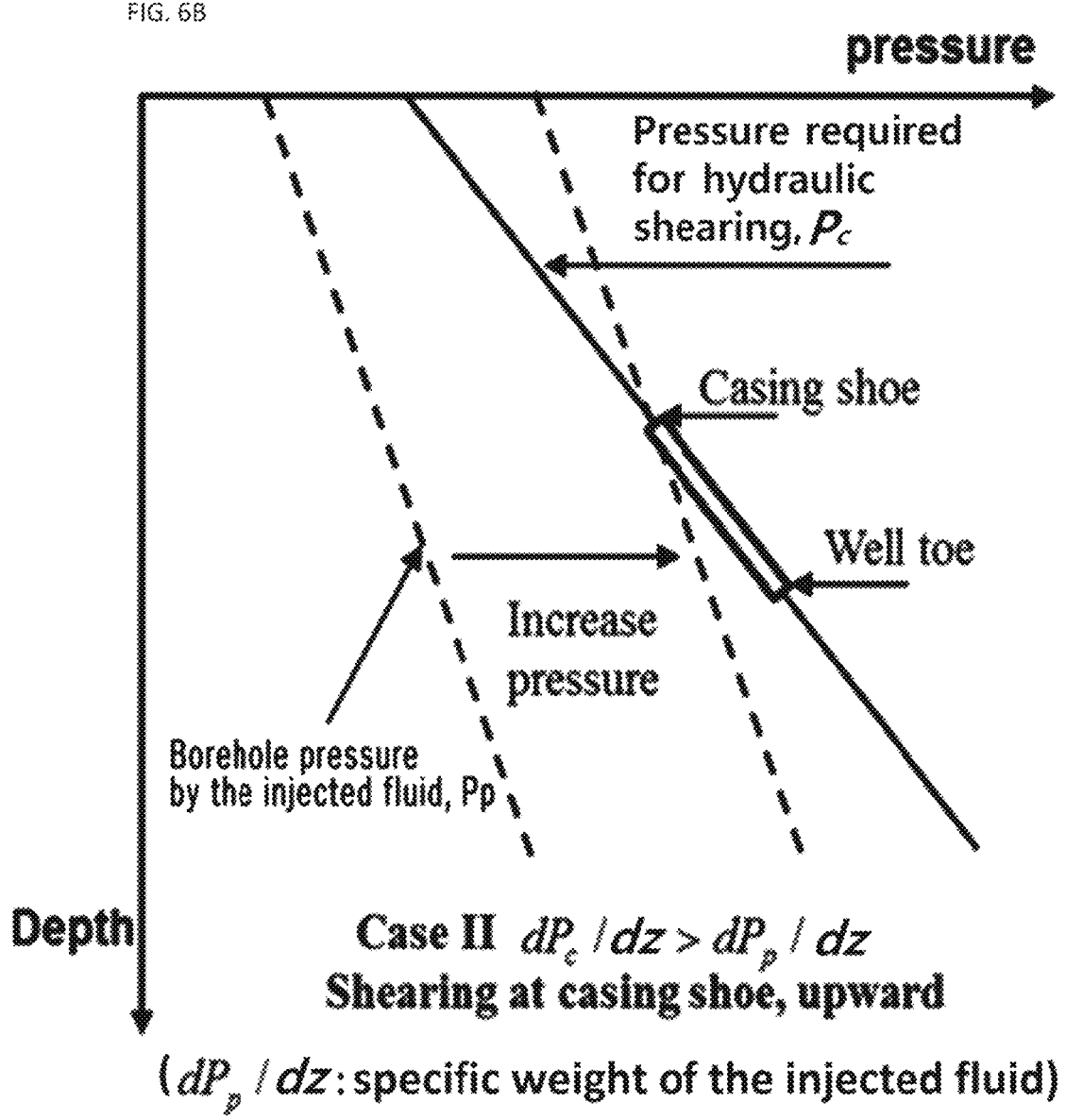

SYSTEM AND PROGRAM FOR PREDICTING THE SHEARING BY FLUID PRESSURE

CROSS-REFERENCE TO RELATED APPLICATIONS

This application claims priority from Korean Patent Application No. 10-2016 0132918, filed on Oct. 13, 2016, in the Korean Intellectual Property Office, the disclosure of which is incorporated herein by reference in its entirety.

BACKGROUND

Field

The present disclosure relates to a system and program for predicting shearing, and more particularly, to a shearing prediction system and program for predicting behavior of joints existing in an underground reservoir being sheared by fluid pressure.

Description of Related Art

Conventionally, hydraulic stimulation technology, which is a method of increasing the permeability of a reservoir by fluid injection, is equated with hydraulic fracturing (or hydrofracturing), which is a mechanism corresponding to generation and extension of tensile fractures by fluid pressure, and hydraulic stimulation prediction technology based on the hydrofracturing mechanism has been developed mostly in the field petroleum and gas development.

The hydrofracturing mechanism-based technology is a technology based on the assumption that, of the fluid injected, all portions of the injected fluid except for a portion of the fluid infiltrated in a rock matrix are used to generate and grow tensile fractures, assuming that there were no existing fractures in a target section of the reservoir.

However, since there actually exist a large number of natural fractures in the reservoir, and most of the fluid injected flows through the fractures that already exist, the hydrofracturing mechanism-based technology developed based on the aforementioned assumption is not suitable to be applied to interpreting hydraulic stimulation in most reservoirs.

Especially, in a situation where new tensile fractures are difficult to occur due to high rock strength, such as in deep geothermal energy development conducted on granitic formations of great depth, the hydrofracturing mechanism-based technology cannot be applied. In such a case, hydraulic stimulation must be performed based on a hydraulic shearing (or hydroshearing) mechanism that promotes flow of fluid through shear expansion of natural joints existing in the reservoir.

In a joint shearing behavior caused by fluid injection in hydraulic shearing, it is very important to predict the key factors such as the required fluid pressure for shearing and the optimal joint shearing direction, which will serve as main design factors determining the success of joint shear expansion in engineering application such as hydraulic stimulation in a deep reservoir and the success of connection to a fluid circulation system based on prediction of an appropriate joint shearing direction.

That is why the inventors of the present disclosure have come to develop a program that could predict various key factors related to joint shearing behaviors caused by the pressure applied during fluid injection, based on input information such as an in-situ stress condition in the rock mass and direction of joints, based on the hydraulic shearing mechanism having higher validity and broader applicability than before regarding fractured rocks to which it is difficult to apply the conventional hydrofracturing mechanism-based prediction technology.

SUMMARY

Therefore, a purpose of the present disclosure for solving the aforementioned problem is to provide a system and program for predicting shearing by fluid pressure.

Another purpose of the present disclosure is to provide a system and program for predicting shearing by fluid pressure, that is based on hydraulic shearing.

Another purpose of the present disclosure is to provide a system and program for predicting shearing by fluid pressure, providing design factors that can be utilized in engineering application such as hydraulic stimulation in a deep reservoir.

Another purpose of the present disclosure is to provide a system and program for predicting shearing by fluid pressure, where prediction can be made depending on whether or not there is rock joint network data.

According to an embodiment of the present disclosure, there is provided a system for predicting shearing by fluid pressure, the system including an interaction unit configured to provide a screen for inputting information necessary for shearing prediction and to provide a user with shearing information predicted according to input information; and a data processing unit configured to receive the input information from the interaction unit and to perform computation for predicting the shearing information, wherein the input information includes a vertical stress $\sigma_v$, a maximum horizontal stress and a minimum horizontal stress of a rock to which fluid is to be injected, a joint friction angle $\phi$, a reservoir rock density $\rho_r$, an injected fluid density, and a coefficient of a sufficient pressure for hydraulic shearing $\alpha$, and based on an assumption that joints are distributed uniformly in all directions of a reservoir, the data processing unit predicts and provides a minimum pressure $P_{cm}$ for hydraulic shearing, the sufficient pressure $P_{co}$ for hydraulic shearing, and an optimal shearing direction using the input information.

Further, the input information may further include rock joint network data, and the data processing unit may predict and provide a pressure required for hydraulic shearing $P_c$, a shearing initiation location in a wellbore and propagation direction, for each rock joint direction of the rock joint network data using the input information.

The minimum pressure required for hydraulic shearing $P_{cm}$ may be predicted by the following equation:

$$P_{cm} = \frac{k_c - k}{k_c - 1}\sigma_3, \quad k = \frac{\sigma_1}{\sigma_3}, \quad k_c = \frac{1 + \sin\phi}{1 - \sin\phi}$$

Herein, $\sigma_1$ may be a maximum principal stress which is greatest among the vertical stress $\sigma_v$, the maximum horizontal stress, and the minimum horizontal stress of the rock, and $\sigma_3$ may be a minimum principal stress which is smallest among the vertical stress $\sigma_v$, the maximum horizontal stress, and the minimum horizontal stress of the rock.

Further, the optimal shearing direction may be predicted by two planes tilted at an angle $\theta(=45°-\phi/2)$ in a direction from the maximum principal stress $\sigma_1$ towards the minimum principal stress $\sigma_3$.

Further, the sufficient pressure for hydraulic shearing $P_{co}$ may be predicted by the following equation:

$$P_{co} = P_{cm} + \alpha(P_{cf} - P_{cm})$$

Herein, $P_{cf}$ may be the minimum principal stress $\sigma_3$, and the coefficient of the sufficient pressure for hydraulic shearing $\alpha$ may have a range of $0 \le \alpha \le 1$.

Further, the pressure $P_c$ required for hydraulic shearing may be predicted by the following equation:

$$P_c = \sigma - \frac{\tau}{\tan\phi}$$

$$\sigma = l^2\sigma_1 + m^2\sigma_2 + n^2\sigma_3$$

$$\tau = \sqrt{(\sigma_1 - \sigma_2)^2 l^2 m^2 + (\sigma_2 - \sigma_3)^2 m^2 n^2 + (\sigma_3 - \sigma_1)^2 n^2 l^2}$$

Herein, $\sigma_1$, $\sigma_2$, and $\sigma_3$ may be three components of an in-situ principal stress, that are the vertical stress, the maximum horizontal stress, and the minimum horizontal stress, aligned according to magnitude ($\sigma_1 \ge \sigma_2 \ge \sigma_3$), l, m, and n may be direction cosines between a normal vector of a joint plane and the three components of the in-situ principal stress.

Further, the shearing initiation location inside the wellbore and propagation direction are predicted by comparing of a depth gradient $dP_c/dz$ of the pressure required for hydraulic shearing to a specific weight of the injected fluid such that if the depth gradient $dP_c/dz$ of the pressure required for hydraulic shearing is smaller than the specific weight of the injected fluid, the shearing is to be initiated at a lowermost end of an open hole section and propagated in a downward direction, and if the depth gradient $dP_c/dz$ of the pressure required for hydraulic shearing is greater than the specific weight of the injected fluid, the shearing is to be initiated at an uppermost end of the open hole section and propagated in an upward direction.

Using a stress polygon indicating all possible stress conditions in a deep reservoir and a stereonet indicating joint plane directions, the data processing unit may further predict and provide: distribution of the minimum pressure required for hydraulic shearing $P_{cm}$ based on a stress state at each point on the stress polygon; distribution of the pressure required for hydraulic shearing $P_c$ based on a joint direction at each point on the stereonet and hydraulic shearing probability by fluid pressure; distribution of the sufficient pressure for hydraulic shearing $P_{co}$ based on the stress state at each point on the stress polygon and hydraulic shearing probability according thereto; distribution of a depth gradient of the pressure required for hydraulic shearing based on the joint direction at each point on the stereonet; and distribution of downward propagation probability calculated based on the depth gradient of the pressure required for hydraulic shearing under the stress state at each point on the stress polygon.

Further, the system for predicting hydraulic shearing by fluid pressure may further include a visualization unit configured to visualize and provide the predicted shearing information on the stress polygon or the stereonet.

According to another embodiment of the present disclosure, there is provided a program for predicting shearing by fluid pressure, the program including inputting input information including a vertical stress $\sigma_v$, a maximum horizontal stress and a minimum horizontal stress of a rock to which fluid is to be injected, a joint friction angle $\phi$, a reservoir rock density $\rho_r$, an injected fluid density, and a coefficient $\alpha$ of a sufficient pressure for hydraulic shearing; and predicting fast calculation menu information that involves predicting and providing shearing information included in a fast calculation menu using the input information, wherein the shearing information included in the fast calculation menu includes one or more of a minimum pressure $P_{cm}$ required for hydraulic shearing, a sufficient pressure $P_{co}$ for hydraulic shearing, and an optimal shearing direction, and the minimum pressure, the sufficient pressure and the optimal shearing direction are computed using the input information, based on an assumption that joints are distributed uniformly in all directions of a reservoir.

At the inputting of information, rock joint network information may be further input, and the predicting of fast calculation menu information may involve further predicting and providing the pressure $P_c$ required for hydraulic shearing or a shearing initiation location in a wellbore and propagation direction, regarding each input rock joint direction.

The step of predicting of fast calculation menu information included in the fast calculation menu may comprise a step of calculating and providing the optimal shearing direction using the vertical stress $\sigma_v$, the maximum horizontal stress, the minimum horizontal stress and the joint friction angle input; a step of calculating and providing a minimum pressure required for hydraulic shearing using the vertical stress $\sigma_v$, the maximum horizontal stress, the minimum horizontal stress and the joint friction angle input; a step of calculating and providing a sufficient pressure for hydraulic shearing using the calculated minimum pressure required for hydraulic shearing and the coefficient of the sufficient pressure for hydraulic shearing; a step of calculating and providing the pressure required for hydraulic shearing of a specific joint using the joint network information, the vertical stress $\sigma_v$, the maximum horizontal stress, the minimum horizontal stress, and the joint friction angle; and a step of calculating a depth gradient of the pressure required for hydraulic shearing of a specific joint using the calculated pressure required for hydraulic shearing of a specific joint and the input rock density and fluid density, to calculate and provide the shearing initiation location in the wellbore and the tendency of propagation direction.

The minimum pressure $P_{cm}$ required for hydraulic shearing $P_{cm}$ may be predicted by the following equation:

$$P_{cm} = \frac{k_c - k}{k_c - 1}\sigma_3, \quad k = \frac{\sigma_1}{\sigma_3}, \quad k_c = \frac{1 + \sin\phi}{1 - \sin\phi}$$

Herein, $\sigma_1$ may be a maximum principal stress which is greatest among the vertical stress $\sigma_v$, the maximum horizontal stress, and the minimum horizontal stress of the rock, and $\sigma_3$ may be a minimum principal stress which is smallest among the vertical stress $\sigma_v$, the maximum horizontal stress, and the minimum horizontal stress of the rock.

The optimal shearing direction may be predicted by two planes tilted at an angle $\theta(=45°-\phi/2)$ in a direction from the maximum principal stress $\sigma_1$ towards the minimum principal stress $\sigma_3$.

The sufficient pressure $P_{co}$ for hydraulic shearing may be predicted by the following equation:

$$P_{co} = P_{cm} + \alpha(P_{cf} - P_{cm})$$

Herein, $P_{cf}$ may be the minimum principal stress $\sigma_3$, and the coefficient $\alpha$ of the sufficient pressure for hydraulic shearing may have a range of $0 \le \alpha \le 1$.

The pressure required for hydraulic shearing $P_c$ may be predicted by the following equation:

$$P_c = \sigma - \frac{\tau}{\tan\phi}$$

$$\sigma = l^2\sigma_1 + m^2\sigma_2 + n^2\sigma_3$$

$$\tau = \sqrt{(\sigma_1-\sigma_2)^2 l^2 m^2 + (\sigma_2-\sigma_3)^2 m^2 n^2 + (\sigma_3-\sigma_1)^2 n^2 l^2}$$

Herein, $\sigma_1$, $\sigma_2$, and $\sigma_3$ may be three components of an in-situ principal stress, that are the vertical stress, the maximum horizontal stress, and the minimum horizontal stress which are aligned according to magnitude ($\sigma_1 \geq \sigma_2 \geq \sigma_3$), l, m, and n are direction cosines between a normal vector of a joint plane and the three components of the in-situ principal stress.

The shearing initiation location inside the wellbore and propagation direction are predicted by comparison of a depth gradient $dP_c/dz$ of the pressure required for hydraulic shearing to a specific weight of the injected fluid such that if a depth gradient $dP_c/dz$ of the pressure required for hydraulic shearing is smaller than a specific weight of the injected fluid as a result of comparison, the shearing is to be initiated at a lowermost end of an open hole section and propagated in a downward direction, and if the depth gradient of the pressure required for hydraulic shearing is greater than the specific weight of the injected fluid, the shearing is to be initiated at an uppermost end of the open hole section and propagated in an upward direction.

The program for predicting shearing by fluid pressure according to an embodiment of the present disclosure may further include a step of predicting advanced analysis menu information for computing and providing shearing information included in a advanced analysis menu using a stress polygon indicating all possible stress conditions in a deep reservoir and a stereonet indicating joint plane directions.

The shearing information included in the advanced analysis menu may include one or more of distribution $P_{cm}$ of the minimum pressure required for hydraulic shearing based on a stress state at each point on the stress polygon; distribution of the pressure $P_c$ required for hydraulic shearing based on a joint direction at each point on the stereonet and hydraulic shearing probability by fluid pressure; distribution of the sufficient pressure $P_{co}$ for hydraulic shearing based on the stress state at each point on the stress polygon and hydraulic shearing probability according thereto; distribution of a depth gradient of the pressure required for hydraulic shearing based on the joint direction at each point on the stereonet; and distribution of downward propagation probability calculated based on the depth gradient of the pressure required for hydraulic shearing under the stress state at each point on the stress polygon.

The program may further include visualizing that involves visualizing and providing the shearing information included in the advanced analysis menu computed.

The system and program for predicting shearing by fluid pressure according to an embodiment of the present disclosure are based on the hydraulic shearing mechanism, and thus have effects of applicability to interpreting engineering application cases in fractured rocks such as hydraulic stimulation of a deep reservoir, providing predicted values regarding key design factors such as the pressure required for hydraulic shearing and the optimal shearing direction, and providing shearing information that can be predicted based on whether or not there is rock joint network data.

BRIEF DESCRIPTION OF THE DRAWINGS

FIG. 6B is a graph illustrating upward propagation in the case where a depth gradient of the pressure required for hydraulic shearing is greater than a specific weight of the injected fluid.

DETAILED DESCRIPTION

Figure 1:
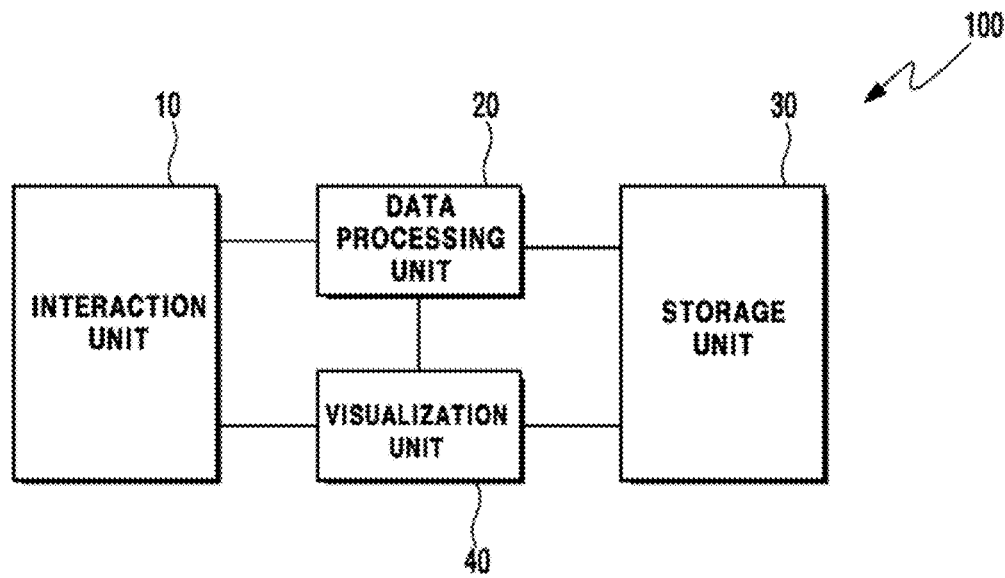
FIG. 1 is a system configuration view of a system for predicting shearing by fluid pressure according to an embodiment of the present disclosure.

Hereinafter, a system and program for predicting shearing by fluid pressure according to the present disclosure will be explained in detail with reference to the drawings attached.

In the explanation below, only the portions necessary for understanding the system and program for predicting shearing by fluid pressure according to an embodiment of the present disclosure, will be explained, and thus explanation on any portion besides those parts may be omitted not to obscure the gist of the present disclosure.

Further, it should be understood that the terms and words used in the present specification and claims are not to be interpreted as being limited in ordinary or dictionary terms, but should be construed as meanings and concepts consistent with the technical idea of the present invention so as to most appropriately express the present invention.

Throughout the specification, when a portion is referred to as "including/comprising" a constituent element, otherwise described to the contrary, it means that the portion may include the element, not that it excludes other constituent elements besides that constituent element. Further, the terms "... unit", "... device", "... module", "... engine", and the like described in the specification mean units for processing at least one function or operation, which may be realized as software, hardware, or a combination of the hardware and software. Here, examples of the hardware include data processing devices such as CPUs and other kind of processors. Further, the software being driven by hardware may refer to a process, an object, an executable file, a thread of execution, a program and the like that is being executed.

Regarding various embodiments, constituent elements having the same configuration will be denoted by the same reference numerals, and explanations will be made of configurations that are different from those of the other embodiments in the other embodiments.

When fluid is injected in a fractured rock reservoir that is in a static equilibrium state, most of the fluid injected flows through rock joints that already exist. When the fluid pressure in a joint plane in a reservoir increases due to the fluid flowing through the fractures, there is no effect on the shear stress being applied to the joint plane, but the effective vertical stress that prevents shearing of the joint plane is reduced, thereby generating joint shearing.

This is called hydraulic shearing (or hydroshearing), and due to the existence of roughness of the joint plane itself, the shearing of the joint plane is accompanied by expansion of a joint aperture, increasing permeability of the reservoir, and consequently allowing more fluid flow in the reservoir.

That is, such a hydraulic shearing serves as the main mechanism of the hydraulic stimulation that enhances the permeability of the reservoir by fluid injection.

Therefore, the system and program for predicting shearing by fluid pressure according to an embodiment of the present invention predict shearing by fluid pressure based on hydraulic shearing that affects hydraulic stimulation in a fractured rock.

FIG. 1 illustrates a system configuration view of a system for predicting shearing by fluid pressure according to an embodiment of the present disclosure.

As illustrated in FIG. 1, the system 100 for predicting shearing by fluid pressure according to an embodiment of the present disclosure may include an interaction unit 10, a data processing unit 20, a storage unit 30, and a visualization unit 40.

The interaction unit 10 is a constituent element that is in charge of interaction between a user and the system 100 for predicting shearing by fluid pressure according to an embodiment of the present disclosure. For interaction with the user, the interaction unit 10 provides a screen where information necessary for predicting shearing may be input, and, through this screen, provides the user with information on the shearing predicted according to the information input by the user.

Figure 2:
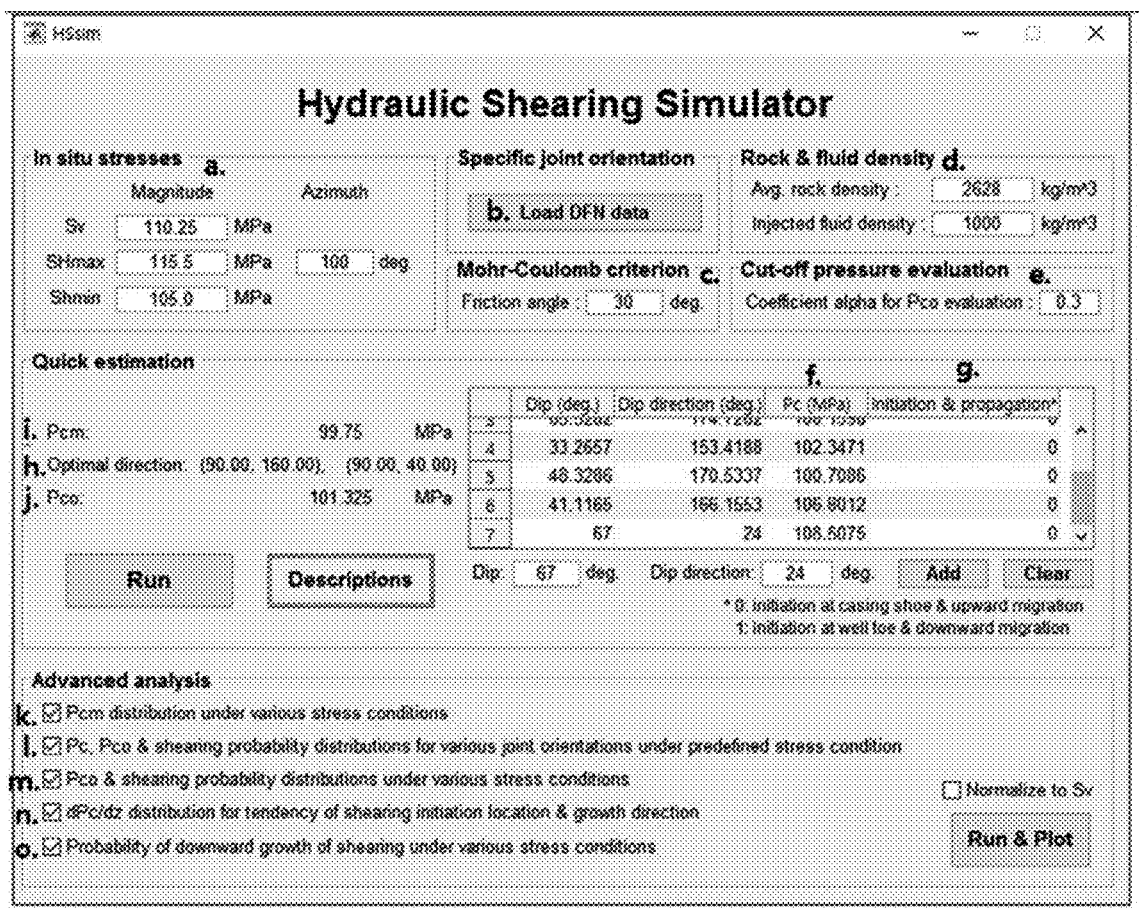
FIG. 2 is a view illustrating an exemplary screen provided by an interaction unit.

An exemplary screen that such an interaction unit 10 provides is illustrated in FIG. 2.

As illustrated in FIG. 2, through the screen, the interaction unit may request the user to input information necessary for predicting shearing, and provide shearing information predicted according to the input information to the user.

Figure 3A:
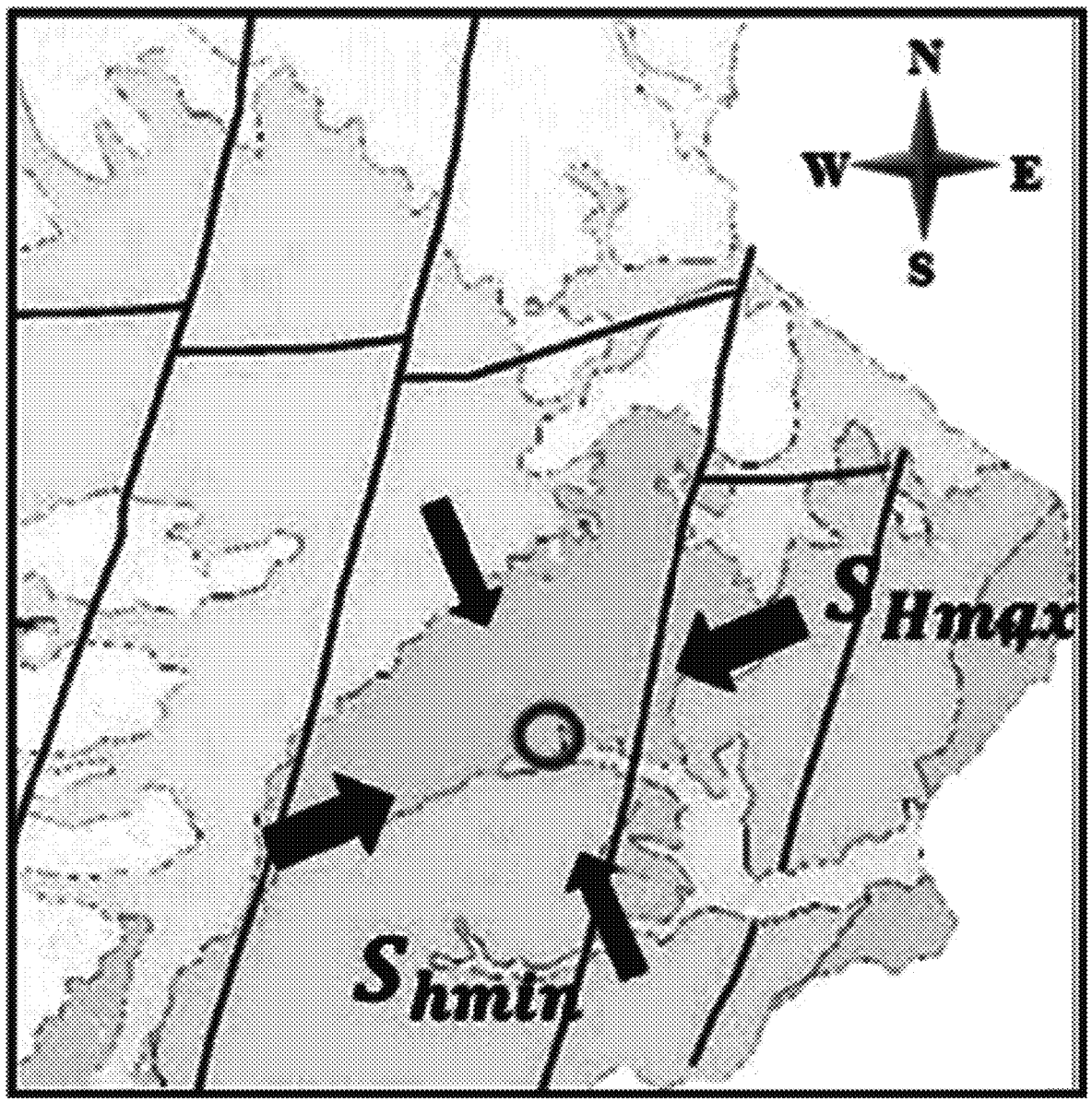
FIGS. 3A to 3C are views illustrating exemplary input information, FIG. 3A illustrating in-situ stress condition data, FIG. 3B illustrating rock joint network data, and FIG. 3C illustrating joint shearing reference property data.
Figure 3B:
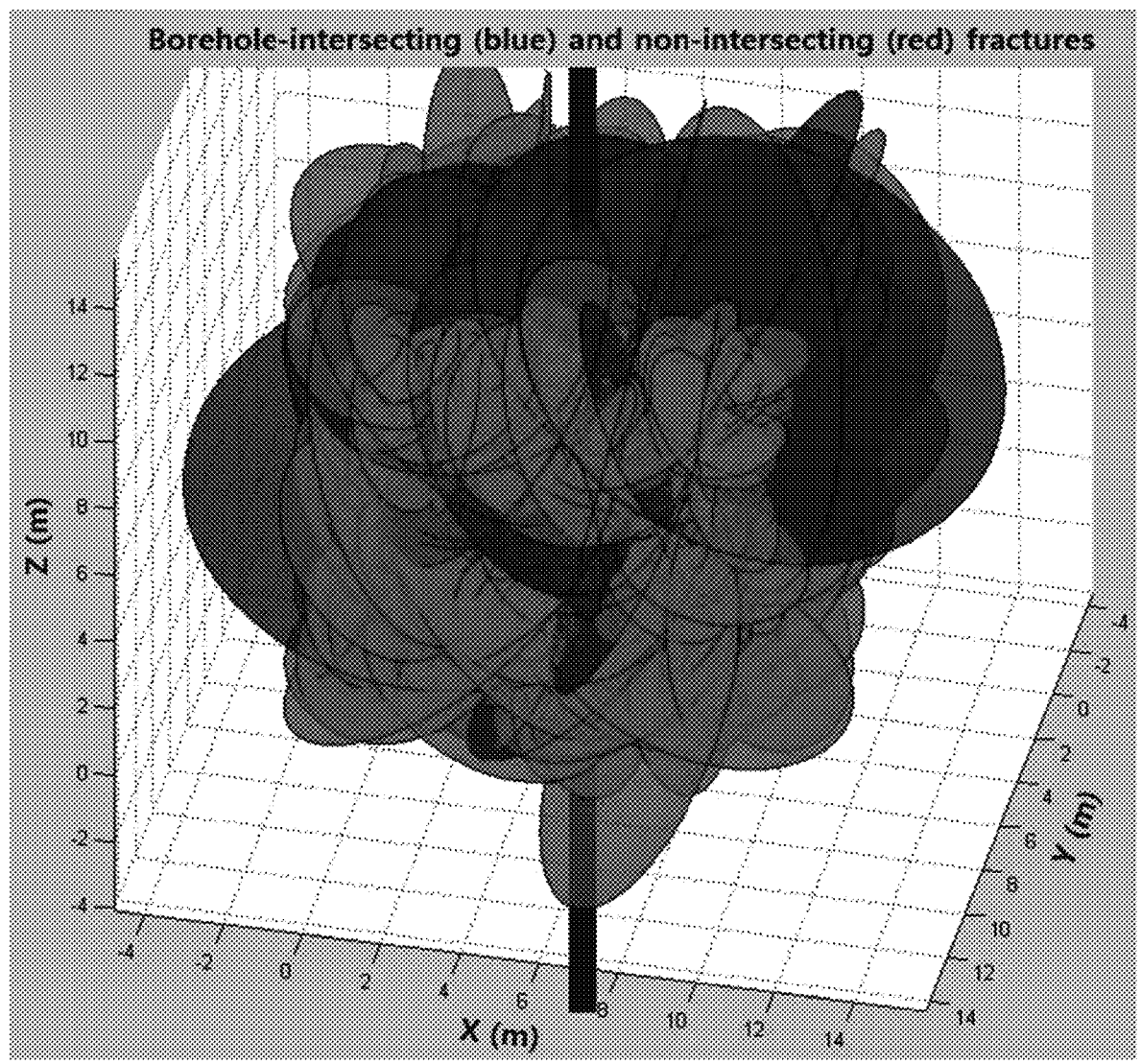
Figure 3C:
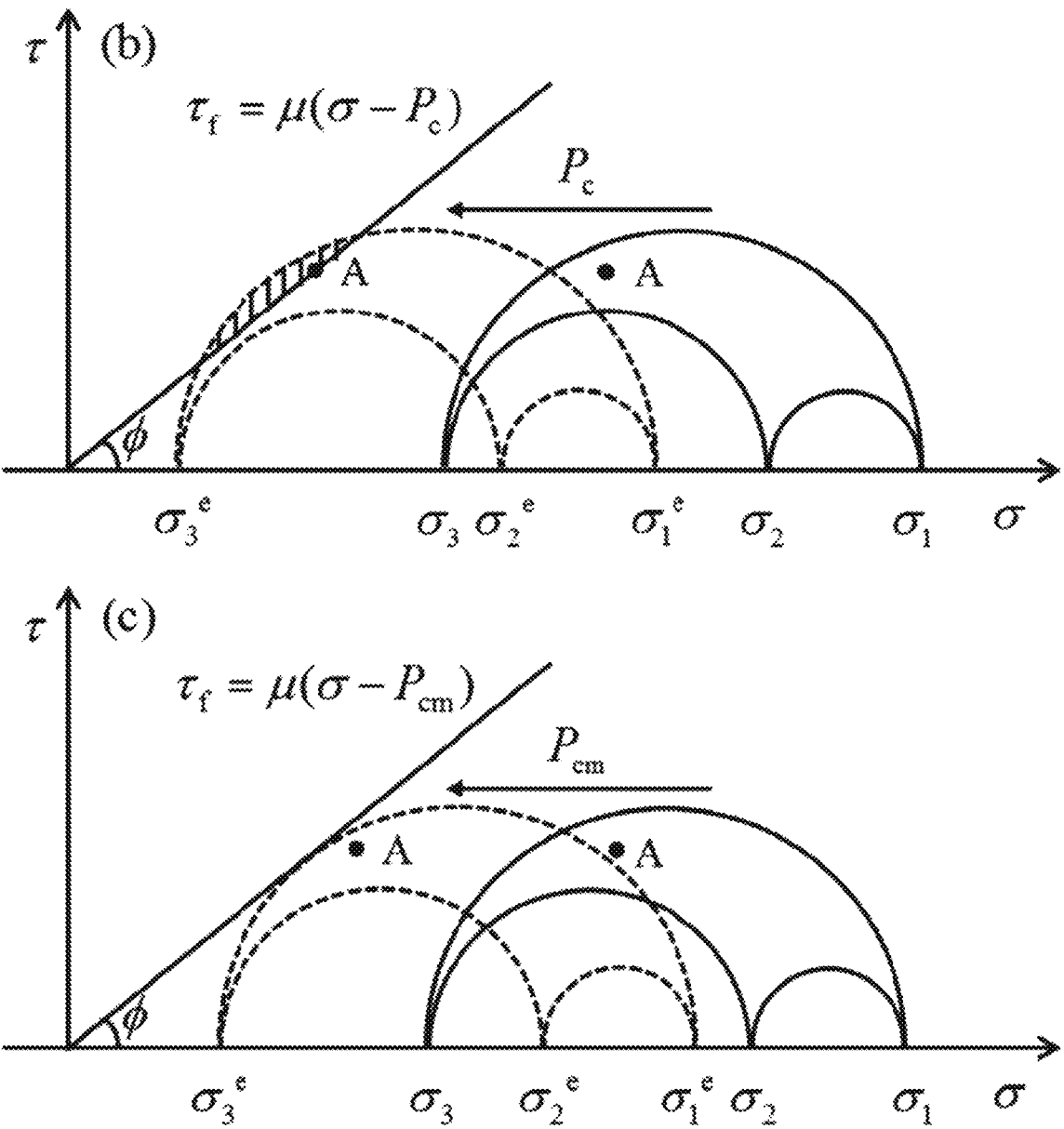

In the system and program for predicting shearing caused by fluid pressure according to an embodiment of the present invention, the information necessary for predicting shearing may include in-situ stress condition data as illustrated in FIG. 3A, rock joint network data as illustrated in FIG. 3B, and data on joint shearing criterion properties, a reservoir rock density, an injected fluid density, and a coefficient of a sufficient pressure for predicting shearing as illustrated in FIG. 3C.

More specifically, the in-situ stress condition data (a) may include a vertical stress $S_v$, a maximum horizontal stress $S_{Hmax}$, an azimuth of maximum horizontal stress, and a minimum horizontal stress $S_{hmin}$ of a rock to which fluid is to be injected.

Figures 4, 5:
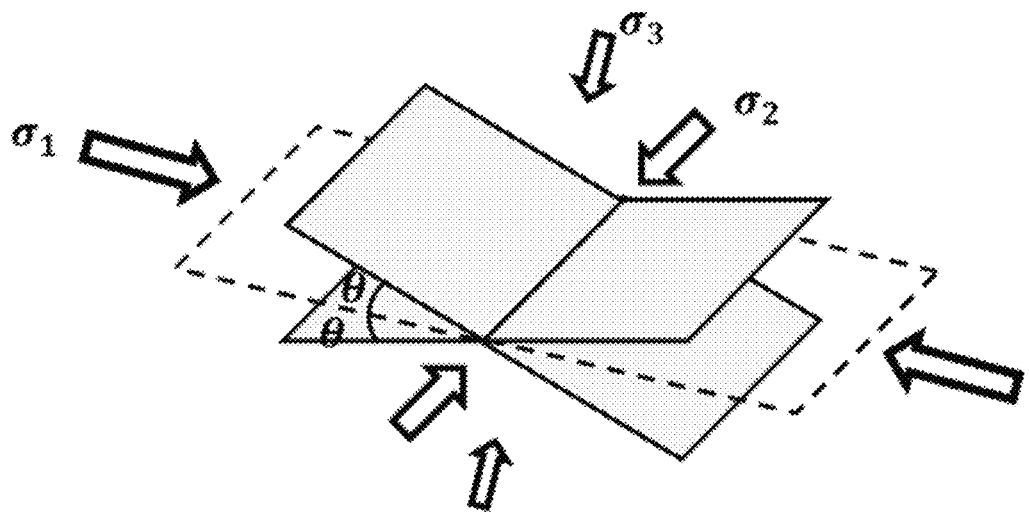
FIG. 4 is an exemplary view illustrating a file format of the rock joint network data that may be read in the system for predicting shearing by fluid pressure according to an embodiment of the present disclosure.
FIG. 5 is a view illustrating prediction of an optimal shearing joint plane direction (blue plane: optimal shearing plane) made by the system for predicting shearing by fluid pressure, according to an embodiment of the present disclosure.

More specifically, the rock joint network data (b) may include coordinates x, y, z, a dip (angle) and a dip direction. As illustrated in FIG. 4, for convenience in inputting data, the rock joint network data (b) may be stored in the storage unit 30 as a text file and then be retrieved from the storage unit 30 when needed.

The data on joint shearing criterion properties (c) is a joint friction angle $\phi$, that is used in defining a Coulomb failure envelope and determining a pressure for generation of joint shearing.

The reservoir rock density $\rho_r$ and the injected fluid density (d) are used to predict a shearing initiation location in an open hole section and propagation direction by computing a depth gradient of the pressure required for hydraulic shearing.

The coefficient of the sufficient pressure for hydraulic shearing (e) is used to determine a sufficient pressure for hydraulic shearing corresponding to the substantial pressure to be consumed for joint shearing in a state where a joint direction is not given.

These input information mentioned so far are information required indispensably or selectively for predicting shearing in the system and program for predicting shearing by fluid pressure according to an embodiment of the present disclosure, and since they are objective information with no subjective judgment of the user, the system and program for predicting shearing by fluid pressure according to an embodiment of the present disclosure may provide objective results that do not involve subjective judgment of the user.

When data (a) to (e) are input through the interaction unit 10, the data processing unit 20 computes shearing information included in the fast calculation menu using the input data, and the computed shearing information is provided to the user through the interaction unit 10 as illustrated in FIG. 2.

The shearing information that may be included in the fast calculation menu are as follows:

f. The pressure $P_c$ required for hydraulic shearing, for each rock joint direction input.

g. The shearing initiation location in a wellbore and the propagation direction for each rock joint direction input.

h. The optimal (minimum pressure) shearing direction (dip, dip direction), when there is no rock joint network information.

i. The minimum pressure $P_{cm}$ required for hydraulic shearing, when there is no rock joint network information.

j. The sufficient pressure $P_{co}$ of hydraulic shearing, when there is no rock joint network information.

Further, the method for computing each shearing information are as follows:

First of all, the pressure $P_c$ required for hydraulic shearing is the fluid pressure capable of shearing a certain joint plane. It may be computed using the in-situ stress condition data (a) and the joint plane friction angle ($\phi$) input.

More specifically, the vertical stress, the maximum horizontal stress and the minimum horizontal stress are the in-situ stress condition data, and three components of the in-situ principal stress ($\sigma_1, \sigma_2, \sigma_3$, $\sigma_1 \geq \sigma_2 \geq \sigma_3$) are obtained by aligning the three stresses according to magnitude, and then the pressure $P_c$ required for hydraulic shearing is calculated using the equation below. Here, $\phi$ is the friction angle of a joint plane, used in defining a Coulomb failure criterion equation, that is a criterion for shearing a joint plane.

$$P_c = \sigma - \frac{\tau}{\tan\phi}$$

Here, the normal stress $\sigma$ and the shear stress $\tau$ on the joint plane may be expressed as below by l, m, and n, that are direction cosines between the normal vector of the joint plane and the three components of the in-situ principal stress.

$$\sigma = l^2\sigma_1 + m^2\sigma_2 + n^2\sigma_3$$

$$\tau = \sqrt{(\sigma_1-\sigma_2)^2 l^2 m^2 + (\sigma_2-\sigma_3)^2 m^2 n^2 + (\sigma_3-\sigma_1)^2 n^2 l^2}$$

Therefore, when there is no rock joint network information, the minimum pressure $P_{cm}$ required for hydraulic shearing may be calculated as follows based on an assumption that joints are distributed uniformly in all directions.

$$P_{cm} = \frac{k_c - k}{k_c - 1}\sigma_3, \quad k = \frac{\sigma_1}{\sigma_3}, \quad k_c = \frac{1+\sin\phi}{1-\sin\phi}$$

The minimum pressure $P_{cm}$ required for hydraulic shearing is the pressure required for hydraulic shearing in the optimal shearing direction, and the optimal shearing direction may be predicted by two planes tilted by as much as angle $\theta$ from the maximum principal stress direction towards the minimum principal stress direction as illustrated in FIG. 5, and here $\theta = 45° - \phi/2$.

Next, the shearing initiation location in a wellbore and the propagation direction is information regarding from which location shearing is to be initiated and to which direction it is to be propagated. Shearing by injected fluid may be initiated from an uppermost end of the open hole section of the wellbore and propagated in an upward direction, or initiated from a lowermost end of the open hole section and propagated in a downward direction.

Regarding such shearing initiation location in a wellbore and the propagation direction, if the depth gradient of the pressure required for hydraulic shearing is smaller than the specific weight (=injected fluid density×gravitational acceleration (g)) of the injected fluid, the shearing is initiated from the lowermost end of the open hole section and propagated in a downward direction, and on the contrary, if the depth gradient of the pressure required for hydraulic shearing is greater than the specific weight of the injected fluid, the shearing is initiated from the uppermost end of the open hole section and is propagated in an upward direction.

Of the in-situ stress condition data, the vertical stress $\sigma^v$ generally increases linearly along with depth in a rock, and thus assuming that all the three components of the in-situ principal stress linearly increase along with depth ($k_1, k_2, k_3$ being constants), the depth gradient $dPc/dz$ of the pressure required for hydraulic shearing is expressed by an equivalent density $\gamma$ as shown below:

$$\sigma_1 = k_1\sigma_v, \quad \sigma_2 = k_2\sigma_v, \quad \sigma_3 = k_3\sigma_v$$

$$d\sigma/dz = (l^2 k_1 + m^2 k_2 + n^2 k_3)\rho_r g = \gamma_\sigma g$$

$$d\tau/dz = \sqrt{(k_1-k_2)^2 l^2 m^2 + (k_2-k_3)^2 m^2 n^2 + (k_3-k_1)^2 n^2 l^2}\, \rho_r g = \gamma_\tau g$$

$$\frac{dP_c}{dz} = \gamma_\sigma g - \frac{\gamma_\tau g}{\tan\phi} = \gamma g$$

Figure 6A:
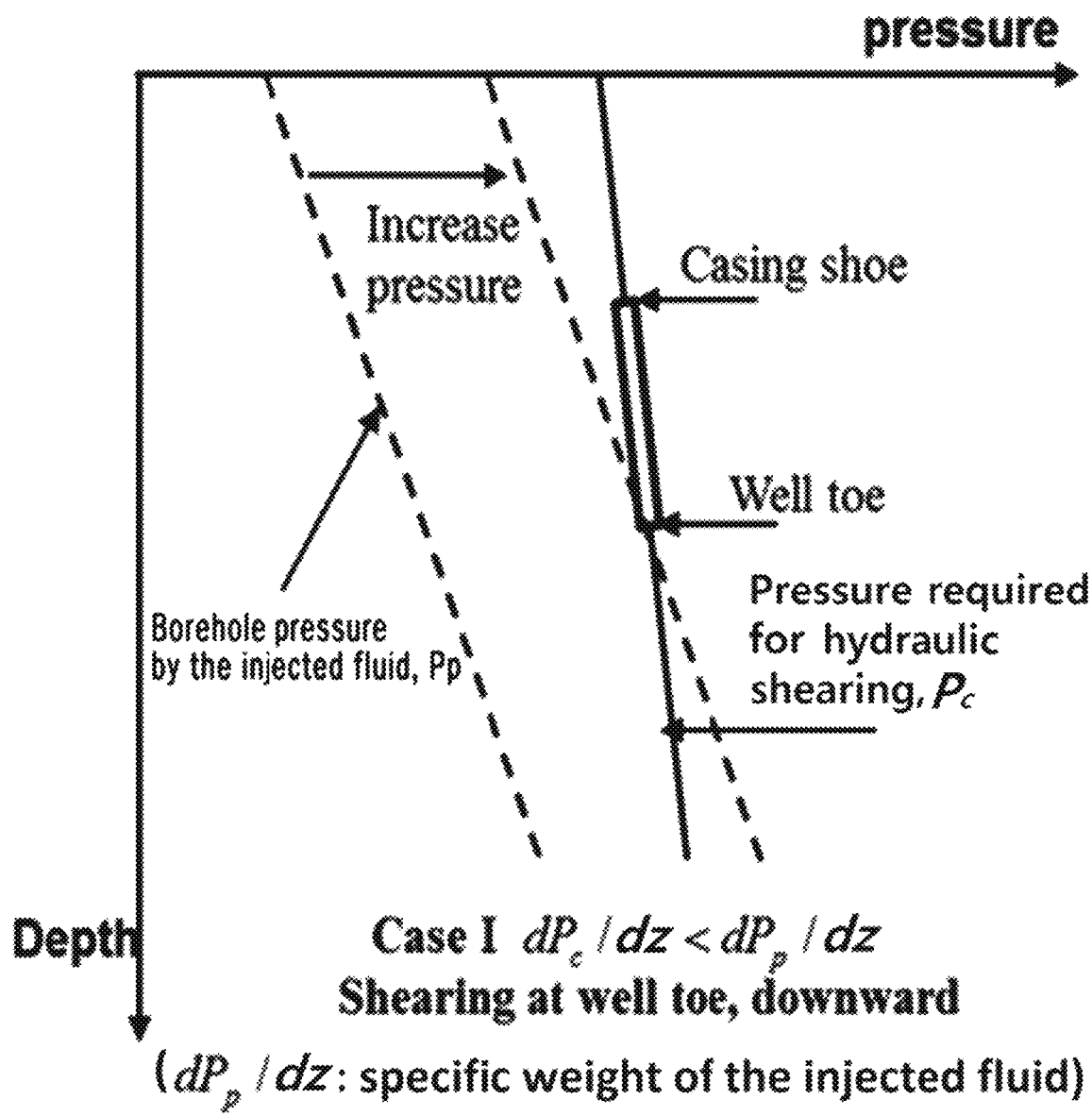
FIG. 6A is a graph illustrating downward propagation in the case where a depth gradient of the pressure required for hydraulic shearing is smaller than a specific weight of the injected fluid.

If the depth gradient of the pressure required for hydraulic shearing is smaller than the specific weight of the injected fluid as illustrated in FIG. 6A as a result of comparison, it may be determined that the shearing is to be initiated at the lowermost end of the open hole section and propagated in a downward direction, and if the depth gradient of the pressure required for hydraulic shearing is greater than the specific weight of the injected fluid as illustrated in FIG. 6B, it may be determined that the shearing is to be initiated at the uppermost end of the open hole section and propagated in an upward direction.

Next, as aforementioned, when there is no rock joint network information, it is possible to predict a theoretically probable minimum pressure $P_{cm}$ required for hydraulic shearing and an optimal shearing joint plane direction corresponding thereto.

However, such a prediction is only accurate when there is a joint in the exact corresponding direction, and in reality, the shearing is initiated starting from a joint in the direction which is the closest to the corresponding optimal shearing joint plane direction, and at a pressure that is higher than the minimum pressure $P_{cm}$ required for hydraulic shearing.

Therefore, the sufficient pressure $P_{co}$ for hydraulic shearing, that is the pressure required to shear a joint misaligned with the optimal shearing direction, is calculated as follows:

$$P_{co} = P_{cm} + \alpha(P_{cf} - P_{cm})$$

Here, $P_{cf}$ is the minimum principal stress $\sigma_3$, and $\alpha$ is the coefficient (e) of the sufficient pressure for hydraulic shearing, that is a constant input for evaluation of the sufficient pressure for hydraulic shearing, and a has a range of $0 \leq \alpha \leq 1$.

Further, the data processing unit 20 may compute the shearing information included in the advanced analysis menu at the user's choice, and the computed shearing information may be provided to the user through the interaction unit 10.

Advanced analysis refers to performing an analysis that goes beyond a single stress condition or a separate joint direction, including tendencies when the stress condition and joint network of a target reservoir are uncertain.

In this case, all stress conditions or data of all joint directions possible in the target reservoir depth are generated utilizing equations used in the fast calculation menu, and based on these generated conditions or data, analysis is performed.

Figure 7A:
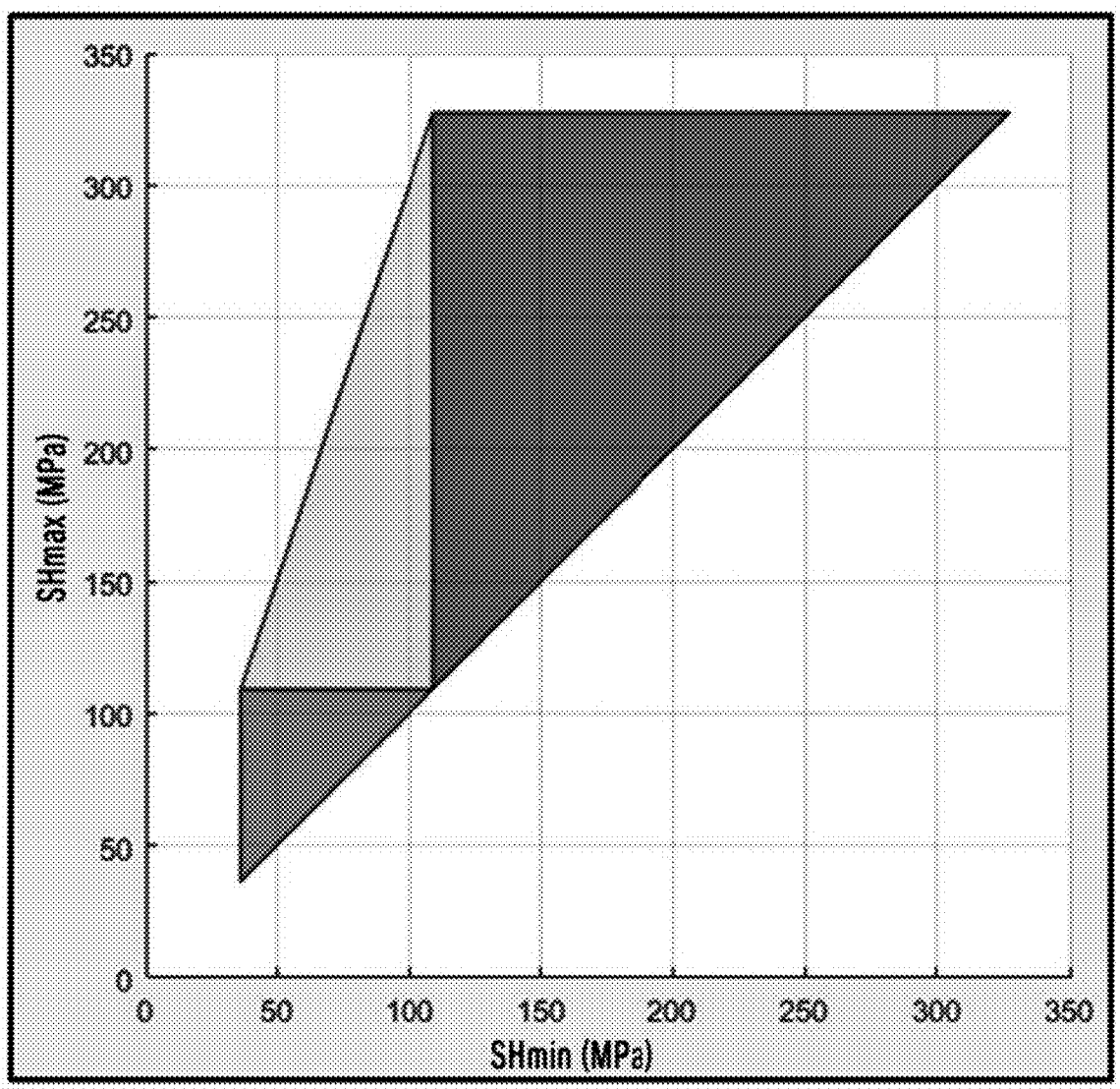
FIG. 7A is a view illustrating a stress polygon.

For specifically, the system for predicting shearing by fluid pressure according to an embodiment of the present disclosure uses a stress polygon such as that illustrated in FIG. 7A in order to indicate all possible stress conditions in the target reservoir depth, and each point in the stress polygon corresponds to the in-situ stress state that is possible in the target reservoir.

Figure 7B:
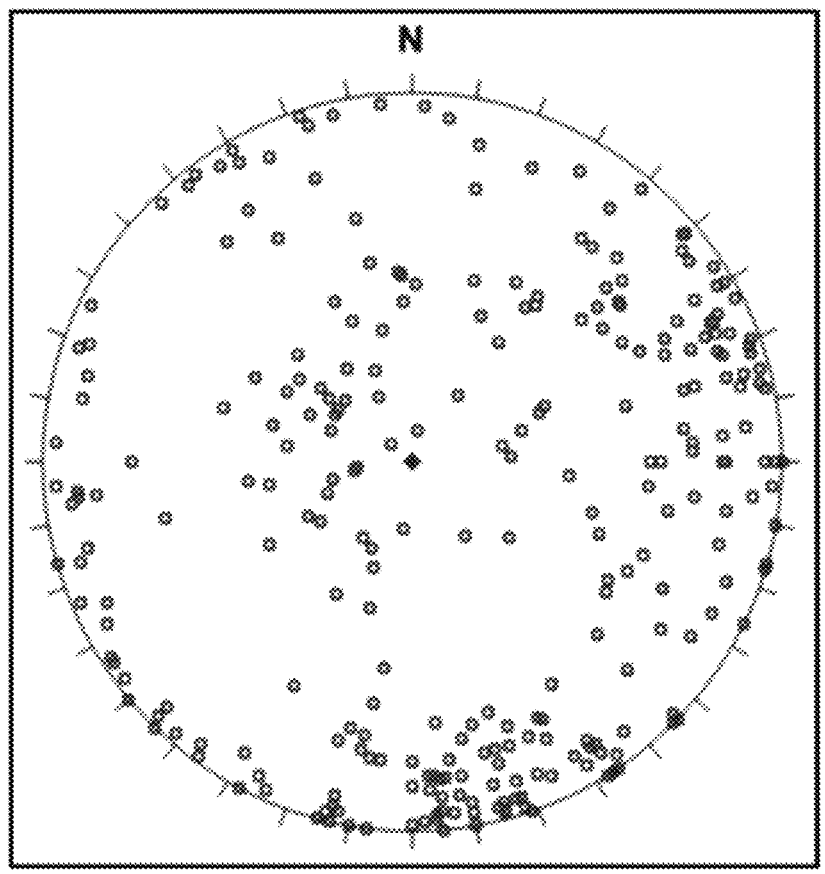
FIG. 7B is a view illustrating a stereonet.

Further, the system for predicting shearing by fluid pressure according to an embodiment of the present disclosure uses a lower hemisphere equal area stereonet as that illustrated in FIG. 7B for the advanced analysis, and each point on the stereonet indicates the joint plane direction corresponding thereto.

That is, the system for predicting shearing by fluid pressure according to an embodiment of the present disclosure determines a stress polygon, and then designates a plurality of stress state points (for example 250 stress state points) on the stress polygon, and designates a plurality of joint direction points (for example, 32,221 joint direction points) on the stereonet, based on which the advanced analysis calculation may be performed.

The shearing information that may be included in such an advanced analysis menu is as follows as illustrated in FIG. 2.

k. Distribution of the minimum pressure $P_{cm}$ required for hydraulic shearing based on a stress state at each point on the stress polygon.

l. Distribution of the pressure $P_c$ required for hydraulic shearing based on a joint direction at each point on the stereonet and hydraulic shearing probability by fluid pressure.

m. Distribution of the sufficient pressure $P_{co}$ for hydraulic shearing based on the stress state at each point on the stress polygon and hydraulic shearing probability according thereto.

n. Distribution of a depth gradient of the pressure required for hydraulic shearing based on the joint direction at each point on the stereonet.

o. Distribution of downward propagation probability calculated based on the depth gradient of the pressure required for hydraulic shearing under the stress state at each point on the stress polygon.

The shearing information included in the advanced analysis menu as aforementioned are information on distribution unlike the shearing information included in the fast calculation menu. Therefore, as illustrated in FIGS. 8A to 8E, the shearing information included in the advanced analysis menu may be visualized and provided as a graph by the visualization unit 40 so that it may be easily checked by the user.

Especially, when plotted with color distribution, it is possible to easily identify distribution tendencies of predicted values related to joint shearing according to various stress conditions and joint directions.

Hereinafter, a method for computing the shearing information that may be included in such an advanced analysis menu and meanings of the result values thereof will be explained in more detail.

Figure 8A:
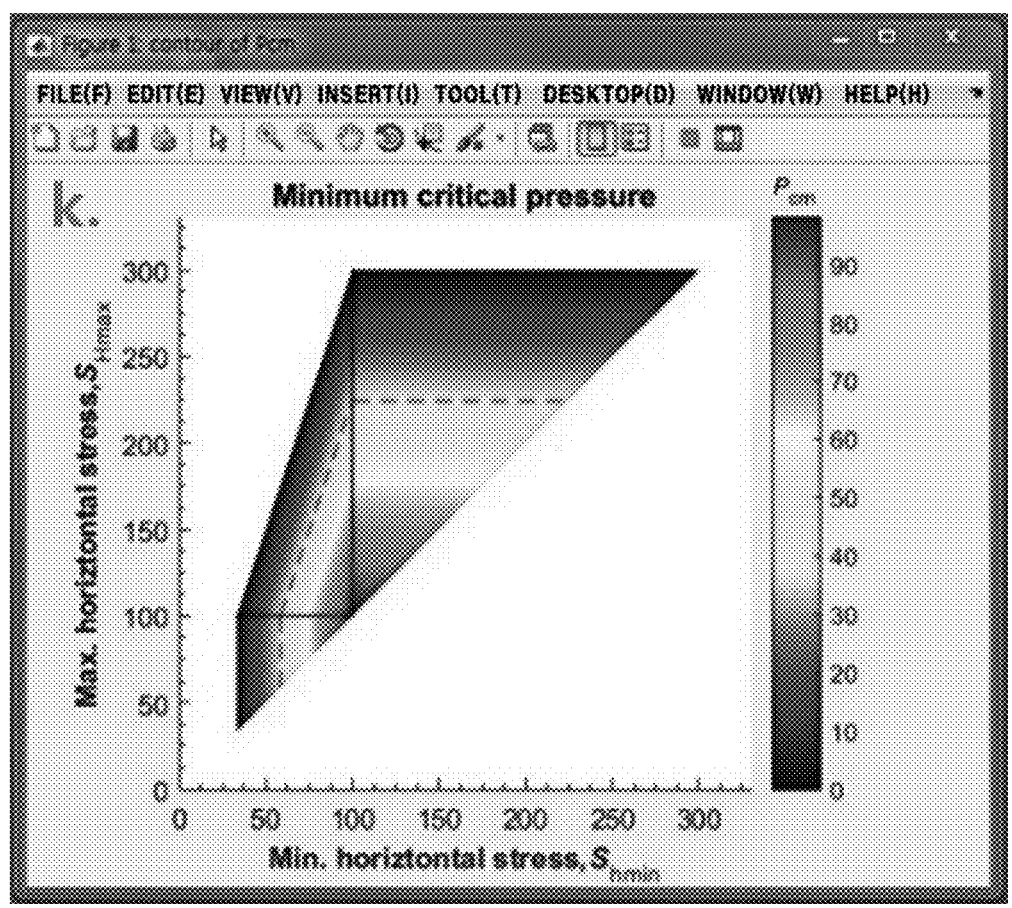
FIGS. 8A to 8E are exemplary graphs of an advanced analysis menu that is visualized and provided by the system for predicting shearing by fluid pressure, according to an embodiment of the present disclosure.

First of all, the distribution of the minimum pressure $P_{cm}$ required for hydraulic shearing is calculated using stress state information at each point on the stress polygon, and then visualized on the stress polygon (refer to graph k in FIG. 8A). The closer the color is to blue, the lower the minimum pressure required for hydraulic shearing in the corresponding stress state. If there is uncertainty in the stress state information, it is possible to identify the distribution tendencies of the minimum pressure required for hydraulic shearing for all possible stress states through this analysis.

Figure 8B:
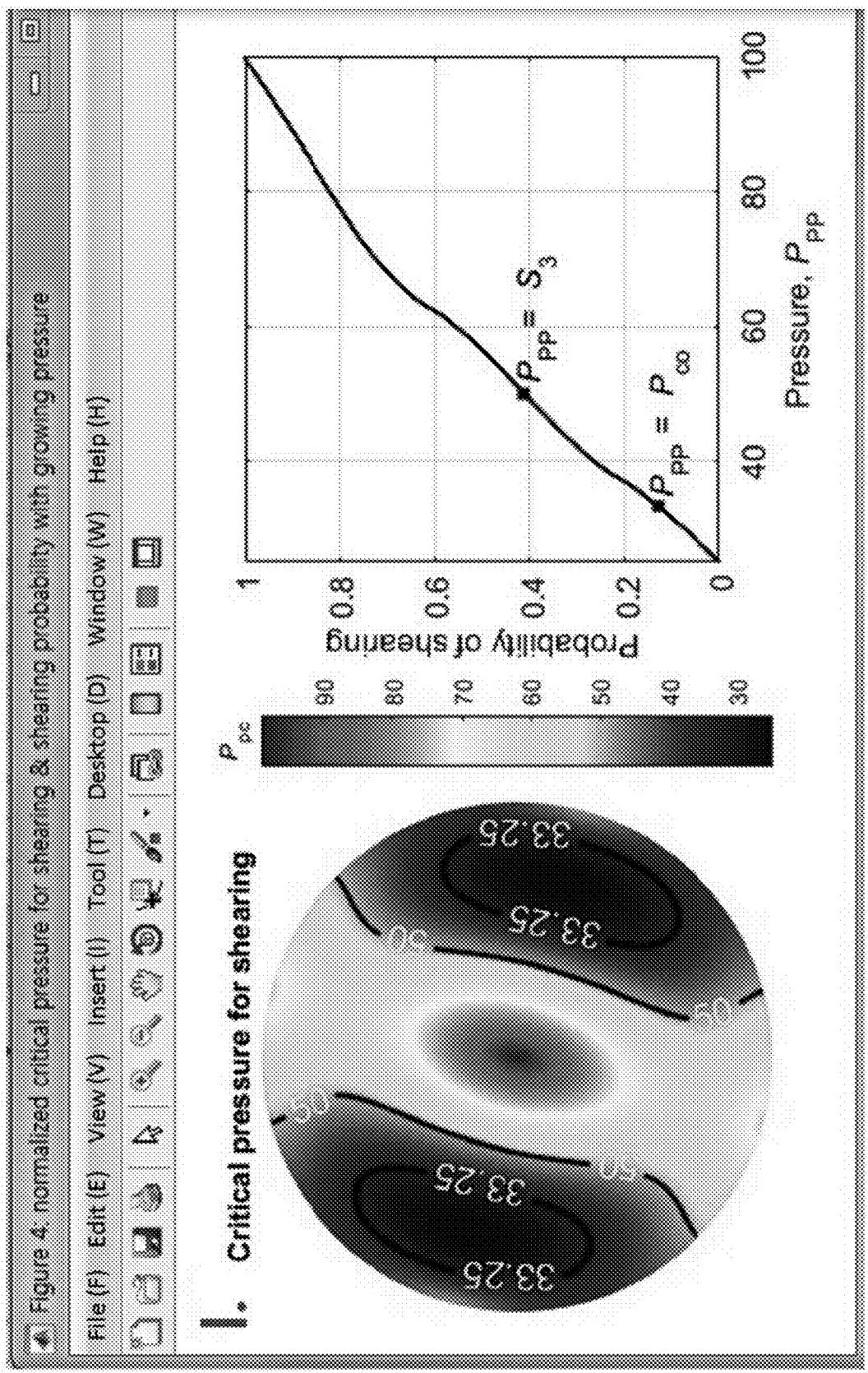

Next, the pressure required for hydraulic shearing $P_c$ is calculated for each joint direction using the joint direction information at each point on the stereonet, and then the distribution is visualized on the stereonet (refer to graph l of FIG. 8B). The closer the color is to blue, the lower the pressure required for hydraulic shearing in the corresponding joint direction.

Further, at the same time, a graph of changes in the hydraulic shearing probability by injected fluid pressure is plotted, wherein the hydraulic shearing probability under a certain fluid pressure is calculated as a ratio of the joint directions of which the pressure required for hydraulic shearing is lower than the injected fluid pressure to all the joint directions on the stereonet. When there is uncertainty in the joint direction information, this analysis can identify the tendency of the distribution of the pressure required for hydraulic shearing regarding all the joint directions, and predict changes in the hydraulic shearing probability the according to the injection pressure.

Figure 8C:
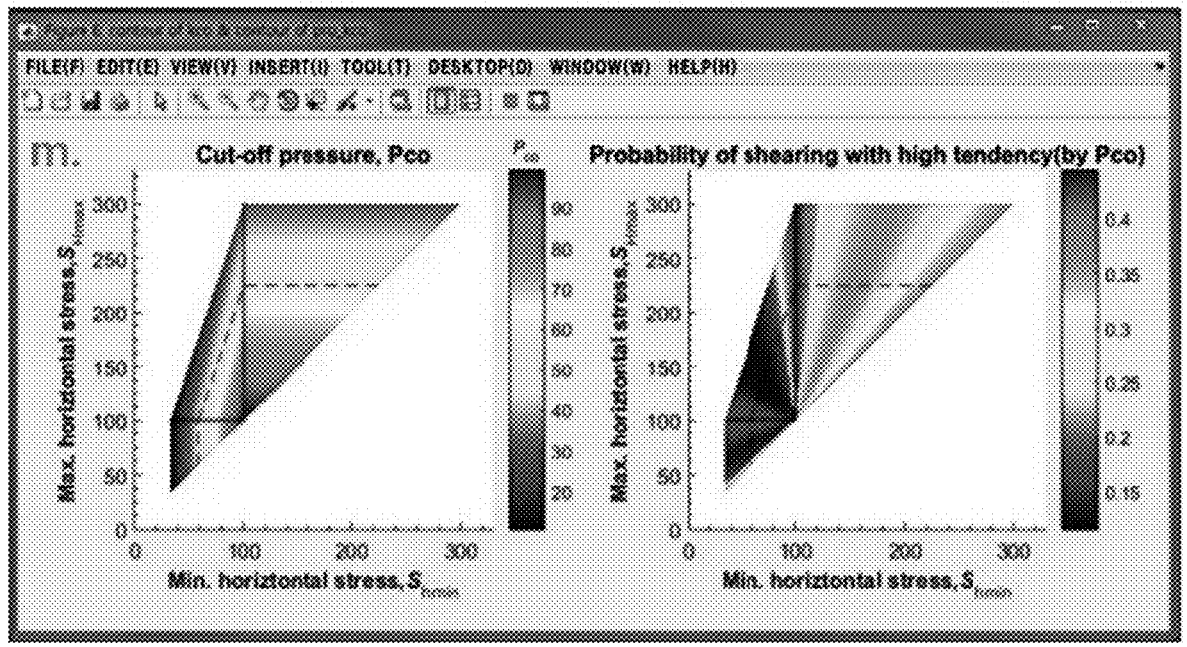

Next, the sufficient pressure $P_{co}$ for hydraulic shearing is calculated based on the stress state at each point on the stress polygon, and then the distribution is visualized on the stress polygon (refer to graph m of FIG. 8C). The closer the color is to blue, the lower the sufficient pressure for hydraulic shearing in the corresponding stress state. At the same time, for each point on the stress polygon, the pressure required for hydraulic shearing $P_c$ for all directions on the stereonet are calculated, and based on the calculated result, the distribution of the sufficient hydraulic shearing probability is visualized.

Here, similar to the hydraulic shearing probability explained above, the sufficient hydraulic shearing probability is calculated as a ratio of the joint directions of which the pressure required for hydraulic shearing is lower to the sufficient pressure for hydraulic shearing to all the joint directions on the stereonet. When there is uncertainty in the stress state and the joint direction information, this analysis can identify the distribution of the sufficient pressure for hydraulic shearing under all possible stress states, and identify the distribution of the sufficient hydraulic shearing probability of a specific stress state.

Figure 8D:
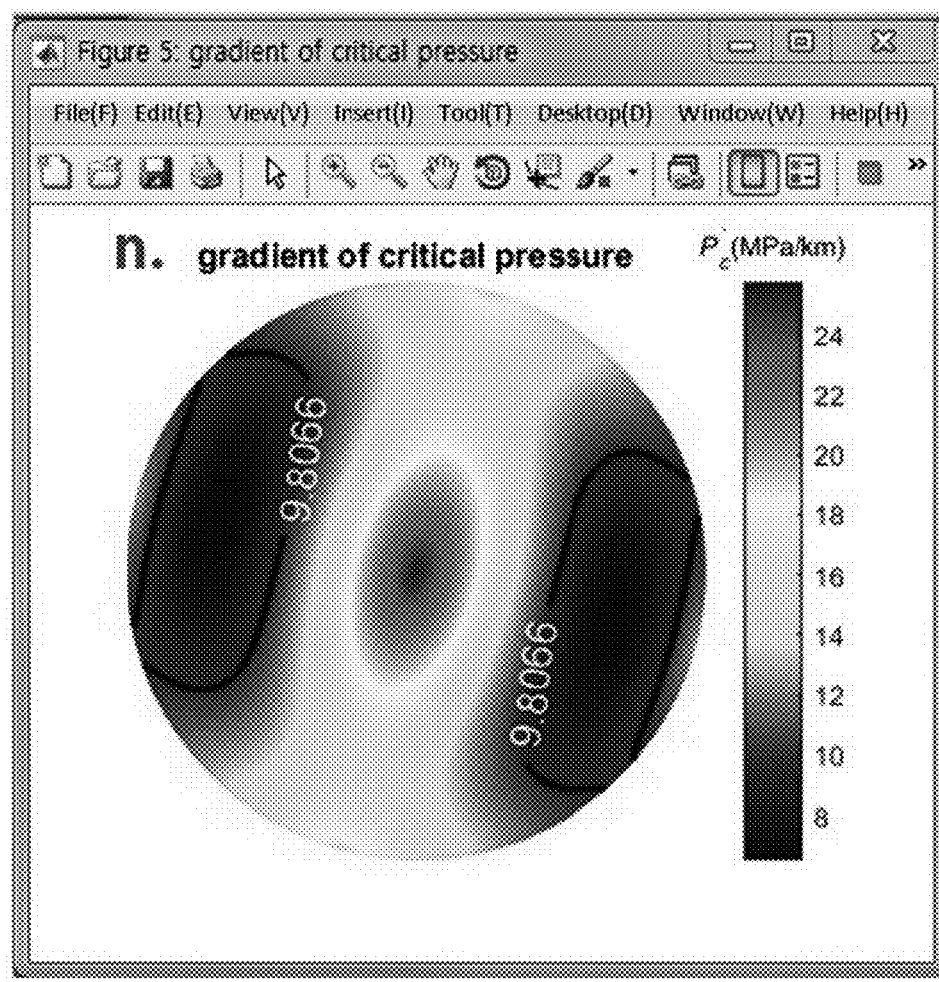

Next, the depth gradient $dP_c/dz$ of the pressure required for hydraulic shearing regarding each joint direction is calculated using the joint direction information at each point on the stereonet, and its distribution is visualized on the stereonet (refer to graph n of FIG. 8D). The closer the color is to blue, the smaller the depth gradient of the pressure required for hydraulic shearing, and the area having a smaller depth gradient of the pressure required for hydraulic shearing with reference to a block contour indicates the joint direction in which hydraulic shearing is predicted to propagate in a downward direction from the lowermost end of the wellbore since the depth gradient of the pressure required for hydraulic shearing is smaller than the specific weight of the injected fluid.

Figure 8E:
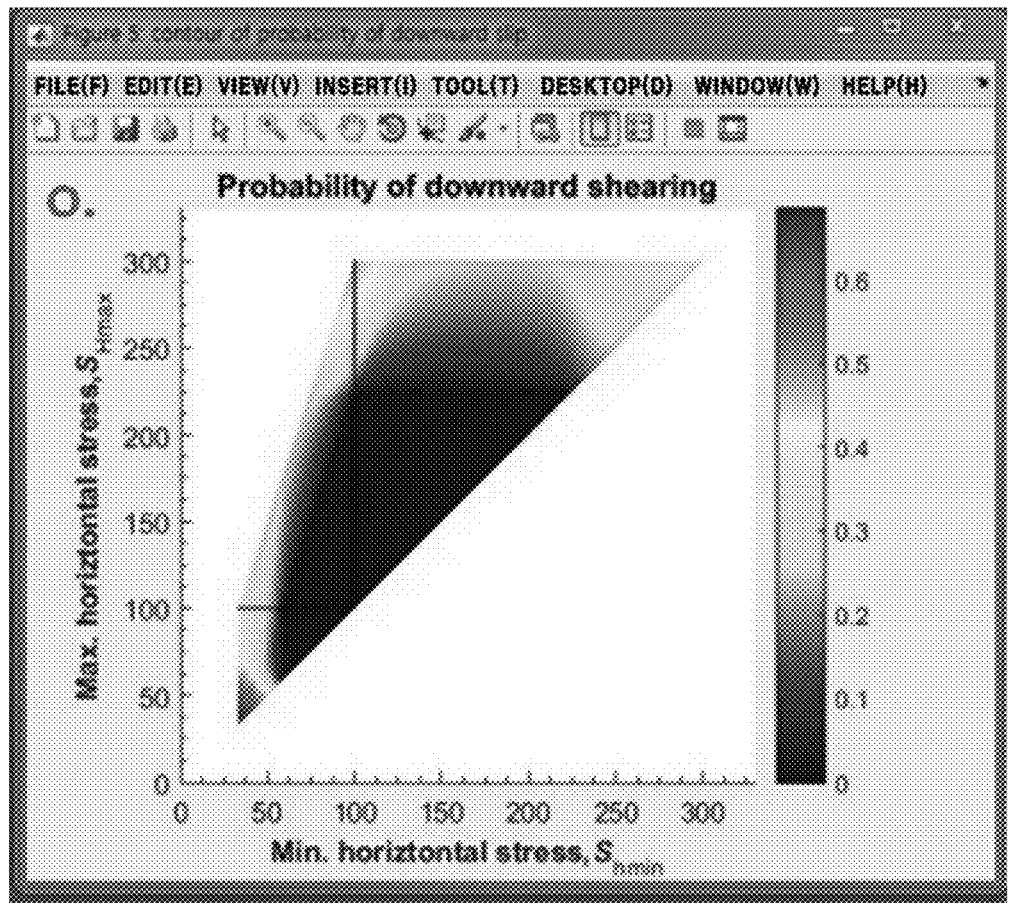

Next, downward propagation probability of hydraulic shearing in all directions on the stereonet is calculated for every stress state at each point on the stress polygon, and its distribution is visualized on the stress polygon (refer to graph o of FIG. 8E). Here, the downward propagation probability of hydraulic shearing in a certain stress state is calculated as a ratio of the joint direction of which the depth gradient of the pressure required for hydraulic shearing is smaller than the specific weight of the injected fluid to all the joint directions. This analysis can identify the tendency of generation of the downward propagation of hydraulic shearing according to stress state.

So far, explanation was made in detail on a method for receiving input information and computing and providing the shearing information in the system for predicting shearing by fluid pressure according to an embodiment of the present disclosure.

Especially, the fast calculation menu and the high-grade analysis menu were explained differently depending on whether or not the shearing information computed and provided by the data processing unit is information that should be visualized using graphs and the like so that the user can easily recognize the results, but there is no limitation to such differentiation of the fast calculation menu and the high-grade analysis menu.

Further, although it was explained that the shearing information of the fast calculation menu is provided as a basic result, whereas the shearing information of the high-grade analysis menu is provided only when selected by the user, it will be appreciated that changes can be made such that the shearing information of the fast calculation menu can also be provided by the user's choice, and the shearing information of the high-grade analysis menu can be provided even without the user's choice.

Further, for convenience of explanation, so far the system for predicting shearing by fluid pressure according to an embodiment of the present disclosure was explained by explaining the interaction unit 10, the data processing unit 20, the storage unit 30, and the visualization unit 40 separately, but the system may be configured such that the functions that each constituent element perform are performed by one or more constituent elements, or such that the functions that two or more constituent elements perform are performed by one constituent element.

Further, the system for predicting shearing by fluid pressure according to an embodiment of the present disclosure may be preferably realized in a computer having a processor, an input/output unit, a storage unit and the like by installing a program (or application) for predicting shearing capable of executing the method for predicting shearing by fluid pressure according to an embodiment of the present disclosure.

Figure 9:
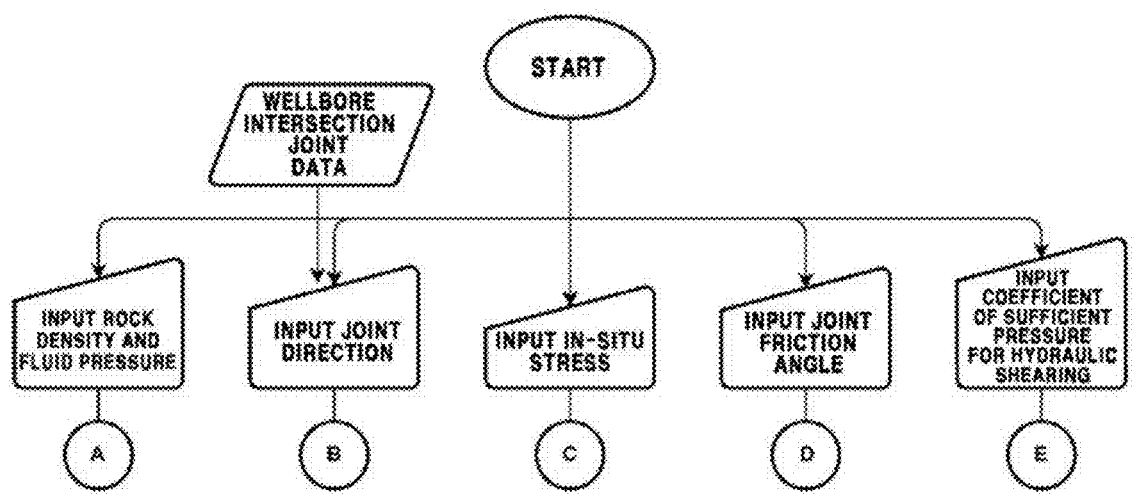
FIG. 9 is a flowchart illustrating steps for inputting information of the program for predicting shearing by fluid pressure, according to an embodiment of the present disclosure.
Figure 10:
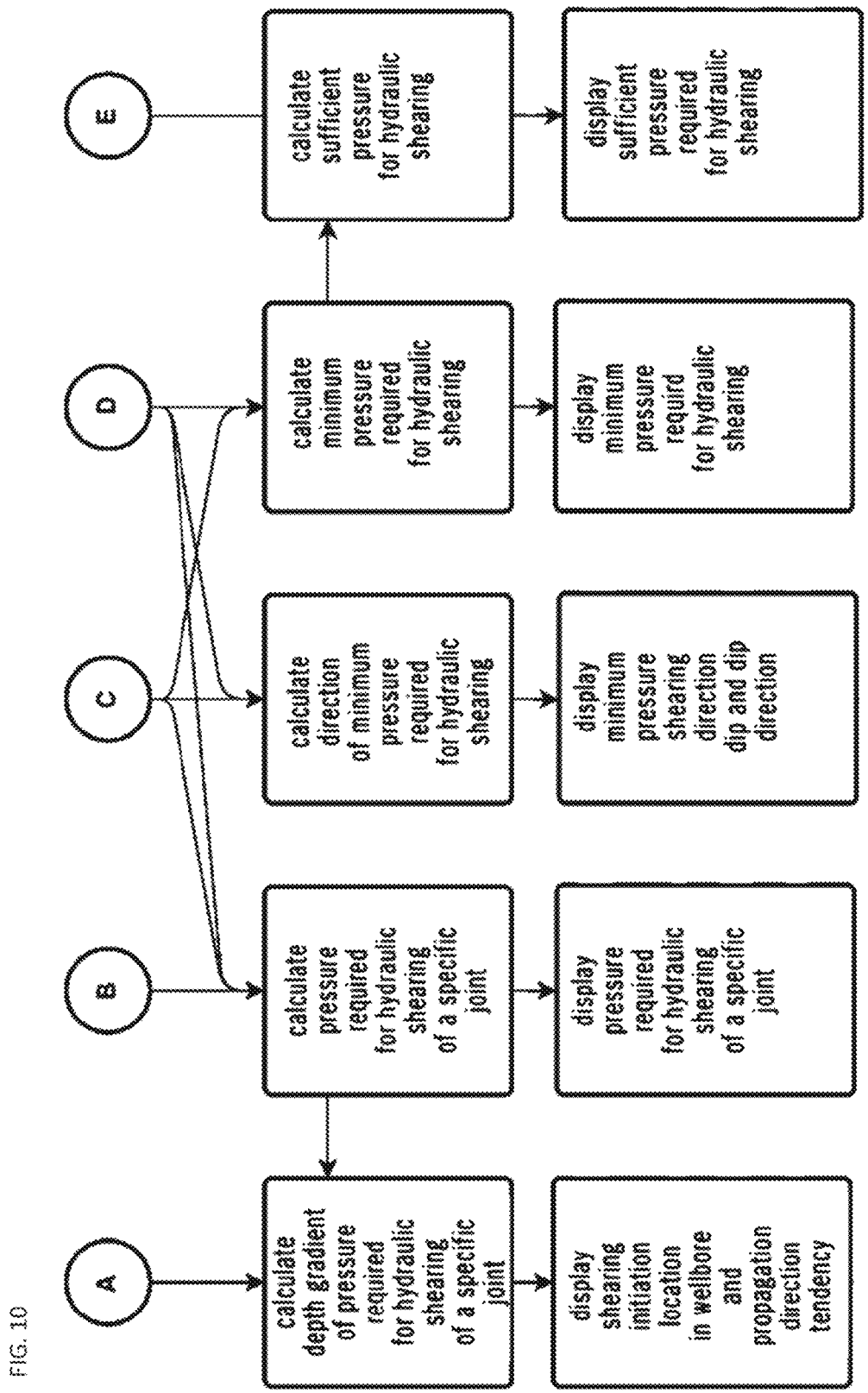
FIG. 10 is a flowchart illustrating steps for predicting fast calculation menu information of the program for predicting shearing by fluid pressure, according to an embodiment of the present disclosure.
Figure 11:
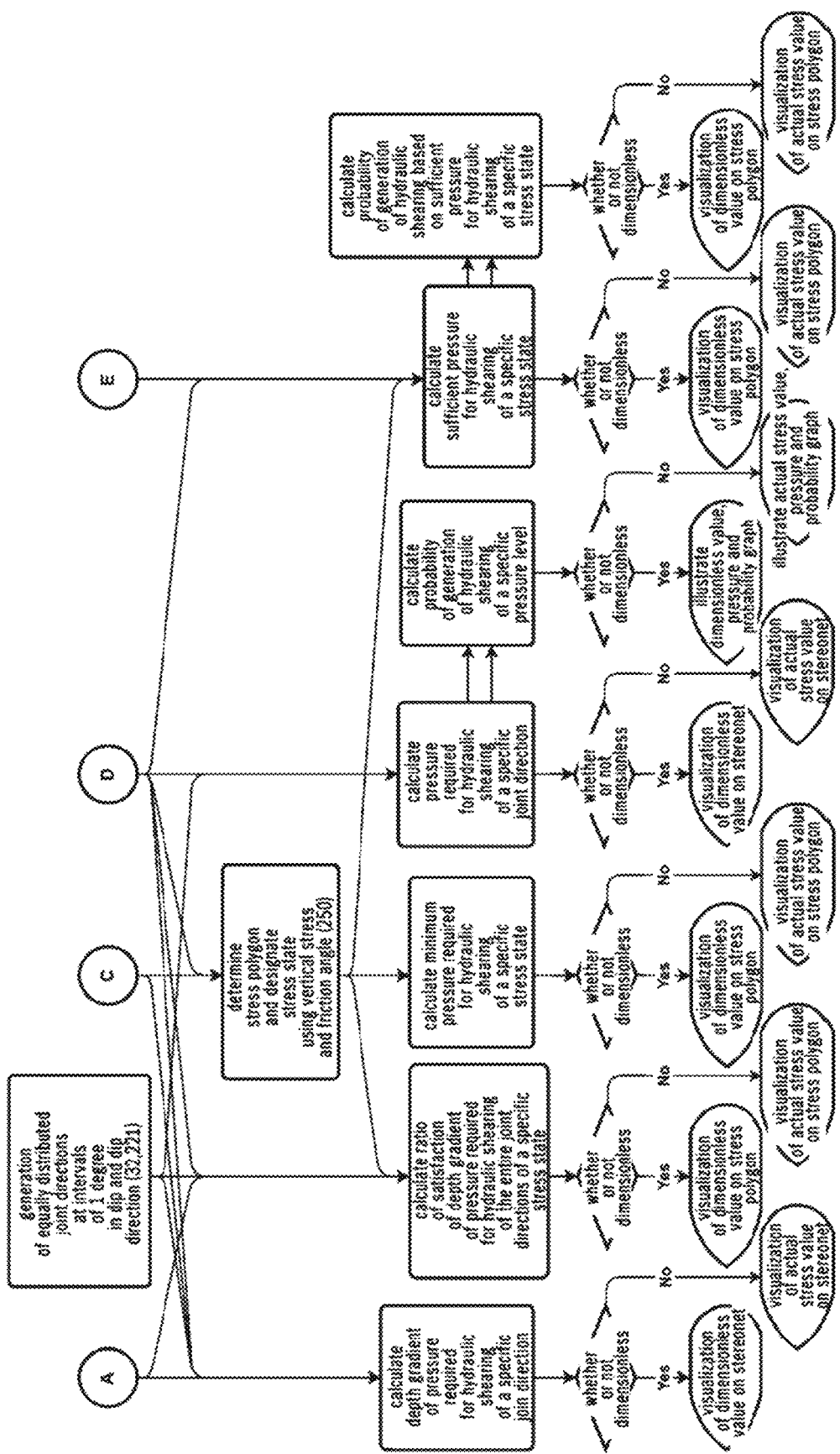
FIG. 11 is a flowchart illustrating steps for predicting advanced analysis menu information of the program for predicting shearing by fluid pressure, according to an embodiment of the present disclosure.

The program for predicting shearing by fluid pressure according to an embodiment of the present disclosure for configuring the system for predicting shearing by fluid pressure according to an embodiment of the present disclosure may be stored in all kinds of record medium that can be read by a computer to enable each step of the flowchart illustrated in FIGS. 9 to 11 to be executed in the computer, and may be transmitted from the record medium to the computer (meaning any device capable of performing computation functions) and installed therein.

Examples of the record medium include read only memory (ROM), random access memory (RAM), compact disk (CD), digital video disk (DVD), magnetic tape, floppy disk, optical data storage device, embedded multimedia card (eMMC), hard disk driver (HDD), micro SD card (HDD), USB memory, and also those realized in forms of carrier wave (for example, transmission via the internet).

More specifically, the program for predicting shearing by fluid pressure according to an embodiment of the present disclosure enables steps including a step of inputting information, a step of predicting fast calculation menu information, and a step of predicting an advanced analysis menu information to be performed in the computer.

At the step of inputting information, as illustrated in FIG. 9, in-situ stress (vertical stress $\sigma_v$, maximum horizontal stress, minimum horizontal stress of the rock to which the fluid pressure is to be injected), joint friction angle $\phi$, reservoir rock density $\rho_r$, injected fluid density, coefficient of the sufficient pressure for hydraulic shearing $\alpha$, and rock joint network information may be input. Here, in the rock joint network information that includes joint directions, wellbore intersection joint data may be included and input as well.

Next, the step of predicting fast calculation menu information is a step of predicting the shearing information included in the fast calculation menu using the information input at the step of inputting information as illustrated in FIG. 10.

The shearing information that may be included in the fast calculation menu is as follows:
- The pressure Pc required for hydraulic shearing in each rock joint direction input.
- The shear initiation location in a wellbore and the propagation direction in each rock joint direction input.
- The optimal (minimum pressure) shearing direction (dip, dip direction).
- The minimum pressure Pcm required for hydraulic shearing.
- The sufficient pressure Pco for hydraulic shearing.

More specifically, as illustrated in FIG. 10, a minimum pressure hydraulic shearing direction may be calculated using the in-situ stress and joint friction angle input to provide the dip and dip direction of the joint plane direction corresponding to the minimum pressure for hydraulic shearing.

Further, using the in-situ stress and the joint friction angle input, the minimum pressure required for hydraulic shearing may be calculated and provided.

Further, using the calculated minimum pressure and the coefficient of the sufficient pressure for hydraulic shearing, the sufficient pressure for predicting shearing may be calculated and provided.

Further, the pressure required for hydraulic shearing of a specific joint may be calculated and provided using the joint network information, in-situ stress and joint friction angle.

Further, the shearing initiation location in the wellbore and tendency of propagation direction may be calculated and provided by calculating the depth gradient of the pressure required for hydraulic shearing of a specific joint using the calculated pressure required for hydraulic shearing and the input rock density and the fluid density.

For a specific equation for calculating the shearing information included in such a fast calculation menu, the same description disclosed above for the system for predicting shearing by fluid pressure according to an embodiment of the present disclosure shall apply.

Next, the step for predicting advanced analysis menu information is a step of computing and providing the shearing information included in the advanced analysis menu using the stress polygon indicating all possible stress conditions in a deep reservoir and the stereonet indicating the joint plane directions, as illustrated in FIG. 11.

The shearing information that may be included in the advanced analysis menu is as follows:
- The distribution of the minimum pressure $P_{cm}$ required for hydraulic shearing based on the stress state at each point on the stress polygon.
- The distribution of the pressure $P_c$ required for hydraulic shearing based on a joint direction at each point on the stereonet and hydraulic shearing probability by fluid pressure.
- The distribution of the sufficient pressure Pco for hydraulic shearing based on the stress state at each point on the stress polygon and sufficient hydraulic shearing probability according thereto.
- The distribution of a depth gradient of the pressure required for hydraulic shearing based on the joint direction at each point on the stereonet.
- The distribution of downward propagation probability calculated based on the depth gradient of the pressure required for hydraulic shearing under the stress state at each point on the stress polygon.

More specifically, after determining the stress polygon using the vertical stress and the joint friction angle of the in-situ stress input as in FIG. 11, and then designating 250 stress state points on the stress polygon, and designating up to 32,221 joint direction points on the stereonet, the advanced analysis calculation may be performed based on the aforementioned. The number of stress state points and the number of joint direction points may vary if necessary.

The shearing information included in the advanced analysis menu may be calculated using the stress state point and the joint direction point and the input information, and for more detailed description, the same description aforementioned for the system for predicting shearing by fluid pressure according to an embodiment of the present disclosure shall apply.

Further, the program for predicting shearing by fluid pressure according to an embodiment of the present disclosure may further include a step of visualizing and providing the shearing information included in the calculated advanced analysis menu as illustrated in FIG. 8.

More specifically, the step of visualizing may visualize the shearing information on a dimensionless value stereonet or stress polygon depending on whether dimensionless or not, or may visualize the shearing information on an actual stress value stereonet or a stress polygon.

So far, the program for predicting shearing by fluid pressure according to an embodiment of the present disclosure was explained with reference to FIGS. 9 to 11. However, although the flowchart illustrated in FIGS. 9 to 11 are illustrated and explained in a series of blocks, there is no limitation to the order of those blocks, and some blocks may be implemented in an order different from that illustrated and disclosed in the specification or simultaneously, and other various divergences, flow paths, and blocks that achieve the equivalent or similar results may be realized. Further, not all the illustrated blocks may be required for realization of the method disclosed in the present specification.

In the drawings and specification, there have been disclosed typical embodiments of the invention, and although specific terms are employed, they are used in a generic and descriptive sense only and not for purposes of limitation. It will be understood by those of ordinary skill in the art that various changes in form and details may be made therein without departing from the spirit and scope of the present invention as defined by the following claims.

What is claimed is:

1. A system for predicting shearing by fluid pressure, the system comprising:
an interactor interaction unit configured to provide a screen for inputting information necessary for shearing prediction and to provide a user with shearing information predicted according to input information;
a data processor configured to receive the input information from the interaction unit and to perform computation for predicting the shearing information,
wherein the input information includes a vertical stress $\sigma_v$, a maximum horizontal stress and a minimum horizontal stress of a rock to which fluid is to be injected, a joint friction angle $\Phi$, a reservoir rock density $\rho_r$, an injected fluid density, and a coefficient of a sufficient pressure a for hydraulic shearing, and based on an assumption that joints are distributed uniformly in all directions of a reservoir, the data processing unit predicts and provides a minimum pressure $P_{cm}$ required for hydraulic shearing, the sufficient pressure $P_{co}$ for hydraulic shearing, and a minimum pressure shearing direction using the input information,
wherein the minimum pressure $P_{em}$ required for hydraulic shearing is predicted by the following equation:

$$P_{cm} = \frac{k_c - k}{k_c - 1}\sigma_3, k = \frac{\sigma_1}{\sigma_3}, k_c = \frac{1 + \sin\phi}{1 - \sin\phi}$$

wherein $\sigma_1$ is a maximum principal stress which is greatest among the vertical stress $\sigma_v$, the maximum horizontal stress, and the minimum horizontal stress of the rock, and a is a minimum principal stress which is smallest among the vertical stress $\sigma_v$, the maximum horizontal stress, and the minimum horizontal stress of the rock, the minimum pressure shearing direction is predicted by two planes tilted at an angle $\theta$ ($=45°-\Phi/2$) in a direction from the maximum principal stress $\sigma_1$ towards the minimum principal stress $\sigma_3$, and the sufficient pressure $P_{co}$ for hydraulic shearing is predicted by the following equation:

$$P_{co} = P_{cm} + \alpha(P_{cf} - P_{cm})$$

wherein $P_{cf}$ is the minimum principal stress $\sigma_3$, and the coefficient $\alpha$ of the sufficient pressure for hydraulic shearing has a range of $0 \le \alpha \le 1$; and
and a visualization unit visualizing the distribution of the minimum pressure Pcm on a stress polygon using a color indicating a level of pressure required for hydraulic shearing in a corresponding stress state, visualizing a distribution on a stereonet of a level of pressure required for hydraulic shearing for each joint direction at each point in the stereonet using a color indicating a level of pressure required for hydraulic shearing in a corresponding joint direction, and visualizing a distribution on a stress polygon of the predicted pressure $P_{co}$ for each point on the stress polygon using a color indicating a level of pressure required for hydraulic shearing in a stress state at a corresponding point of the stress polygon.

2. The system according to claim 1,
wherein the input information further comprises rock joint network data, and the data processing unit predicts and provides a pressure $P_c$ required for hydraulic shearing, a shearing initiation location in a wellbore and propagation direction, for each rock joint direction of the rock joint network data using the input information.

3. The system according to claim 2,
wherein the pressure $P_c$ required for hydraulic shearing is predicted by the following equation:

$$P_c = \sigma - \frac{\tau}{\tan\phi}$$
$$\sigma = l^2\sigma_1 + m^2\sigma_2 + n^2\sigma_3$$
$$\tau = \sqrt{(\sigma_1 - \sigma_2)^2 l^2 m^2 + (\sigma_2 - \sigma_3)^2 m^2 n^2 + (\sigma_3 - \sigma_1)^2 n^2 l^2}$$

wherein $\sigma_1$, $\sigma_2$, and $\sigma_3$ are three components of an in-situ principal stress, that are the vertical stress, the maximum horizontal stress, and the minimum horizontal stress which are aligned according to magnitude ($\sigma_1 \le \sigma_2 \ge \sigma_3$), l, m, and n are direction cosines between a normal vector of a joint plane and the three components of the in-situ principal stress, and
the shearing initiation location inside the wellbore and propagation direction are predicted by comparing of a depth gradient $dP_c/dz$ of the pressure required for hydraulic shearing to a specific weight of the injected fluid such that if the depth gradient $dP_c/dz$ of the pressure required for hydraulic shearing is smaller than the specific weight of the injected fluid, the shearing is to be initiated at a lowermost end of an open hole section and propagated in a downward direction, and if the depth gradient $dP_c/dz$ of the pressure required for hydraulic shearing is greater than the specific weight of the injected fluid, the shearing is to be initiated at an uppermost end of the open hole section and propagated in an upward direction.

4. The system according to claim 1,
wherein, using the stress polygon indicating all possible stress conditions in a deep reservoir and the stereonet indicating joint plane directions, the data processing unit further predicts and provides:
distribution of the minimum pressure $P_{cm}$ required for hydraulic shearing based on the stress state at each point on the stress polygon;
distribution of the pressure $P_c$ required for hydraulic shearing based on the joint direction at each point on the stereonet and hydraulic shearing probability by fluid pressure;
distribution of the sufficient pressure $P_{co}$ for hydraulic shearing based on the stress state at each point on the stress polygon and sufficient hydraulic shearing probability according thereto;
distribution of a depth gradient of the pressure required for hydraulic shearing based on the joint direction at each point on the stereonet; and
distribution of downward propagation probability calculated based on the depth gradient of the pressure required for hydraulic shearing under the stress state at each point on the stress polygon.

5. The system according to claim 2,
wherein, using the stress polygon indicating all possible stress conditions in a deep reservoir and the stereonet indicating joint plane directions, the data processing unit further predicts and provides:
distribution of the minimum pressure $P_{cm}$ required for hydraulic shearing based on the stress state at each point on the stress polygon;
distribution of the pressure $P_c$ required for hydraulic shearing based on the joint direction at each point on the stereonet and hydraulic shearing probability by fluid pressure;
distribution of the sufficient pressure $P_{co}$ for hydraulic shearing based on the stress state at each point on the stress polygon and sufficient hydraulic shearing probability according thereto;
distribution of a depth gradient of the pressure required for hydraulic shearing based on the joint direction at each point on the stereonet; and
distribution of downward propagation probability calculated based on the depth gradient of the pressure required for hydraulic shearing under the stress state at each point on the stress polygon.

6. The system and method according to claim 3,
wherein, using the stress polygon indicating all possible stress conditions in a deep reservoir and the stereonet indicating joint plane directions, the data processing unit further predicts and provides:
distribution of the minimum pressure $P_{cm}$ required for hydraulic shearing based on a stress state at each point on the stress polygon;
distribution of the pressure $P_c$ required for hydraulic shearing based on the joint direction at each point on the stereonet and hydraulic shearing probability by fluid pressure;
distribution of the sufficient pressure $P_{co}$ for hydraulic shearing based on the stress state at each point on the stress polygon and sufficient hydraulic shearing probability according thereto;
distribution of a depth gradient of the pressure required for hydraulic shearing based on the joint direction at each point on the stereonet; and
distribution of downward propagation probability calculated based on the depth gradient of the pressure required for hydraulic shearing under the stress state at each point on the stress polygon.

7. The system according to claim 4,
wherein the visualization unit is configured to visualize and provide the predicted shearing information on the stress polygon or the stereonet.

8. A program for predicting shearing by fluid pressure, the program comprising the following steps:
inputting input information including a vertical stress $\sigma_v$, a maximum horizontal stress and a minimum horizontal stress of a rock to which fluid is to be injected, a joint friction angle $\Phi$, a reservoir rock density $\rho_r$, an injected fluid density, and a coefficient $\alpha$ of a sufficient pressure for hydraulic shearing; and
predicting and providing shearing information included in a fast calculation menu, using the input information,
wherein the shearing information included in the fast calculation menu includes one or more of a minimum pressure $P_{cm}$ required for hydraulic shearing, a sufficient pressure $P_{co}$ for hydraulic shearing, and a minimum pressure shearing direction, and the minimum pressure, the sufficient pressure and the minimum pressure shearing direction are computed using the input information, based on an assumption that joints are distributed uniformly in all directions of a reservoir,
wherein the minimum pressure $P_{cm}$ required for hydraulic shearing is predicted by the following equation:
wherein $\sigma 1$ is a maximum principal stress which is greatest $$P_{cm} = \frac{k_c - k}{k_c - 1}\sigma_3,\ k = \frac{\sigma_1}{\sigma_3},\ k_c = \frac{1 + \sin\phi}{1 - \sin\phi}$$

among the vertical stress $\sigma_v$, the maximum horizontal stress, and the minimum horizontal stress of the rock, and $\sigma_3$ is a minimum principal stress which is smallest among the vertical stress $\sigma_v$, the maximum horizontal stress, and the minimum horizontal stress of the rock,
the minimum pressure shearing direction is predicted by two planes tilted at an angle $\theta(=45°-\Phi/2)$ in a direction from the maximum principal stress $\sigma_1$ towards the minimum principal stress $\sigma_3$, and
the sufficient pressure $P_{co}$ for hydraulic shearing is predicted by the following equation:

$$P_{co} = P_{cm} + \alpha(P_{cf} - P_{cm})$$

wherein $P_{cf}$ is the minimum principal stress $\sigma_3$, and the coefficient $\alpha$ of the sufficient pressure for hydraulic shearing has a range of $0 \leq \alpha \leq 1$; and
visualizing, by a visualization unit, the distribution of the minimum pressure $P_{cm}$ on a stress polygon using a color indicating a level of pressure required for hydraulic shearing in a corresponding stress state, visualizing a distribution on a stereonet of a level of pressure required for hydraulic shearing for each joint direction at each point in the stereonet using a color indicating a level of pressure required for hydraulic shearing in a corresponding joint direction, and visualizing a distribution on a stress polygon of the predicted pressure $P_{co}$ for each point on the stress polygon using a color indicating a level of pressure required for hydraulic shearing in a stress state at the corresponding point on the stress polygon.

9. The program according to claim 8,
wherein the input information further comprises rock joint network information and
the shearing information further comprises a pressure $P_c$ required for hydraulic shearing or a shearing initiation location in a wellbore and propagation direction, regarding each input rock joint direction.

10. The program according to claim 9,
wherein the step of predicting and providing shearing information included in the fast calculation menu comprises the following steps:
calculating and providing the minimum pressure shearing direction using the vertical stress $\sigma_v$, the maximum horizontal stress, the minimum horizontal stress and the joint friction angle input;
calculating and providing a minimum pressure required for hydraulic shearing using the vertical stress $\sigma_v$, the maximum horizontal stress, the minimum horizontal stress and the joint friction angle input;
calculating and providing a sufficient pressure for hydraulic shearing using the calculated minimum pressure required for hydraulic shearing and the coefficient of the sufficient pressure for hydraulic shearing;
calculating and providing the pressure required for hydraulic shearing of a specific joint using the joint network information, the vertical stress $\sigma_v$, the maximum horizontal stress, the minimum horizontal stress, and the joint friction angle; and
calculating a depth gradient of the pressure required for hydraulic shearing of a specific joint using the calculated pressure required for hydraulic shearing of a specific joint and the input rock density and fluid density, to calculate and provide the shearing initiation location in the wellbore and propagation direction tendency.

11. The program according to claim 9,
wherein the pressure required for hydraulic shearing $P_c$ is predicted by the following equation:

$$P_c = \sigma - \frac{\tau}{\tan\phi}$$
$$\sigma = l^2\sigma_1 + m^2\sigma_2 + n^2\sigma_3$$
$$\tau = \sqrt{(\sigma_1 - \sigma_2)^2 l^2 m^2 + (\sigma_2 - \sigma_3)^2 m^2 n^2 + (\sigma_3 - \sigma_1)^2 n^2 l^2}$$

wherein $\sigma_1$, $\sigma_2$, and $\sigma_3$ are three components of an in-situ principal stress, that are the vertical stress, the maximum horizontal stress, and the minimum horizontal stress which are aligned according to magnitude ($\sigma_1 \geq \sigma_2 \geq \sigma_3$), l, m, and n are direction cosines between a normal vector of a joint plane and the three components of the in-situ principal stress, and
the shearing initiation location inside the wellbore and propagation direction are predicted by comparison of a depth gradient $dP_c/dz$ of the pressure required for hydraulic shearing to a specific weight of the injected fluid such that if a depth gradient $dP_c/dz$ of the pressure required for hydraulic shearing is smaller than a specific weight of the injected fluid, the shearing is to be initiated at a lowermost end of an open hole section and propagated in a downward direction, and if the depth gradient $dP_c/dz$ of the pressure required for hydraulic shearing is greater than the specific weight of the injected fluid, the shearing is to be initiated at an uppermost end of the open hole section and propagated in an upward direction.

12. The program according to claim 8,
further comprising a step of predicting advanced analysis menu information for computing and providing shearing information included in an advanced analysis menu using the stress polygon indicating all possible stress conditions in a deep reservoir and the stereonet indicating joint plane directions,
wherein the shearing information included in the advanced analysis menu includes one or more of:
distribution of the minimum pressure $P_{cm}$ required for hydraulic shearing based on the stress state at each point on the stress polygon;
distribution of the pressure $P_c$ required for hydraulic shearing based on the joint direction at each point on the stereonet and hydraulic shearing probability by fluid pressure;
distribution of the sufficient pressure $P_{co}$ for hydraulic shearing based on the stress state at each point on the stress polygon and sufficient hydraulic shearing probability according thereto;
distribution of a depth gradient of the pressure required for hydraulic shearing based on the joint direction at each point on the stereonet; and
distribution of downward propagation probability calculated based on the depth gradient of the pressure required for hydraulic shearing under the stress state at each point on the stress polygon.

13. The program according to claim 9,
further comprising a step of predicting advanced analysis menu information for computing and providing shearing information included in an advanced analysis menu using the stress polygon indicating all possible stress conditions in a deep reservoir and the stereonet indicating all possible joint plane directions,
wherein the shearing information included in the advanced analysis menu includes one or more of:
distribution of the minimum pressure $P_{cm}$ required for hydraulic shearing based on the stress state at each point on the stress polygon;
distribution of the pressure $P_c$ required for hydraulic shearing based on the joint direction at each point on the stereonet and hydraulic shearing probability by fluid pressure;
distribution of the sufficient pressure $P_{co}$ for hydraulic shearing based on the stress state at each point on the stress polygon and sufficient hydraulic shearing probability according thereto;
distribution of a depth gradient of the pressure required for hydraulic shearing based on the joint direction at each point on the stereonet; and
distribution of downward propagation probability calculated based on the depth gradient of the pressure required for hydraulic shearing under the stress state at each point on the stress polygon.

14. The program according to claim 10, further comprising a step of predicting advanced analysis menu information for computing and providing shearing information included in an advanced analysis menu using the stress polygon indicating all possible stress conditions in a deep reservoir and the stereonet indicating all possible joint plane directions,
  wherein the shearing information included in the advanced analysis menu includes one or more of:
  distribution of the minimum pressure $P_{cm}$ required for hydraulic shearing based on the stress state at each point on the stress polygon;
  distribution of the pressure $P_c$ required for hydraulic shearing based on the joint direction at each point on the stereonet and hydraulic shearing probability by fluid pressure;
  distribution of the sufficient pressure $P_{co}$ for hydraulic shearing based on the stress state at each point on the stress polygon and sufficient hydraulic shearing probability according thereto;
  distribution of a depth gradient of the pressure required for hydraulic shearing based on the joint direction at each point on the stereonet; and
  distribution of downward propagation probability calculated based on the depth gradient of the pressure required for hydraulic shearing under the stress state at each point on the stress polygon.

15. The program according to claim 11,
further comprising a step of predicting advanced analysis menu information for computing and providing shearing information included in an advanced analysis menu using a stress polygon indicating all possible stress conditions in a deep reservoir and a stereonet indicating joint plane directions,
wherein the shearing information included in the advanced analysis menu includes one or more of:
distribution of the minimum pressure $P_{cm}$ required for hydraulic shearing based on a stress state at each point on the stress polygon;
distribution of the pressure $P_c$ required for hydraulic shearing based on a joint direction at each point on the stereonet and hydraulic shearing probability by fluid pressure;
distribution of the sufficient pressure $P_{co}$ for hydraulic shearing based on the stress state at each point on the stress polygon and sufficient hydraulic shearing probability according thereto;
distribution of a depth gradient of the pressure required for hydraulic shearing based on the joint direction at each point on the stereonet; and
distribution of downward propagation probability calculated based on the depth gradient of the pressure required for hydraulic shearing under the stress state at each point on the stress polygon.

* * * * *